(12) United States Patent
Lawrence

(10) Patent No.: US 9,172,477 B2
(45) Date of Patent: Oct. 27, 2015

(54) WIRELESS DEVICE DETECTION USING MULTIPLE ANTENNAS SEPARATED BY AN RF SHIELD

(71) Applicant: INTHINC TECHNOLOGY SOLUTIONS, INC., West Valley City, UT (US)

(72) Inventor: Stephen M. Lawrence, Salt Lake City, UT (US)

(73) Assignee: inthinc Technology Solutions, Inc., West Valley City, UT (US)

( * ) Notice: Subject to any disclaimer, the term of this patent is extended or adjusted under 35 U.S.C. 154(b) by 0 days.

(21) Appl. No.: 14/181,007

(22) Filed: Feb. 14, 2014

(65) Prior Publication Data

US 2015/0118985 A1    Apr. 30, 2015

Related U.S. Application Data

(60) Provisional application No. 61/897,648, filed on Oct. 30, 2013.

(51) Int. Cl.
| | | |
|---|---|---|
| H04B 17/00 | (2015.01) | |
| H04B 17/27 | (2015.01) | |
| H04B 17/318 | (2015.01) | |

(52) U.S. Cl.
CPC .............. *H04B 17/27* (2015.01); *H04B 17/318* (2015.01)

(58) Field of Classification Search
USPC ............ 455/11.1, 422.1, 456.1, 67.11, 67.14, 455/550.1, 575.1, 226.1, 226.2, 235, 347; 343/702, 713
See application file for complete search history.

(56) References Cited

U.S. PATENT DOCUMENTS

| | | |
|---|---|---|
| 1,767,325 A | 6/1930 | Taylor |
| 3,975,708 A | 8/1976 | Lusk |
| 4,344,136 A | 8/1982 | Panik |
| 4,369,427 A | 1/1983 | Drebinger et al. |
| 4,395,624 A | 7/1983 | Wartski |
| 4,419,654 A | 12/1983 | Funk |
| 4,458,535 A | 7/1984 | Juergens |

(Continued)

FOREIGN PATENT DOCUMENTS

| | | |
|---|---|---|
| CA | 2071931 | 12/1993 |
| CA | 2307259 | 10/2001 |

(Continued)

OTHER PUBLICATIONS

Ogle, et al. "Accuracy of Global Positioning System for Determining Driver Performance Parameters", Transportation Research Record 1818; Paper No. 02-1063; pp. 12-24. Available at least as early as Feb 2003.

(Continued)

*Primary Examiner* — Thanh Le
(74) *Attorney, Agent, or Firm* — Workman Nydegger

(57) ABSTRACT

A system comprising one or more interior antenna(s) positioned within an at least partially enclosed operator area of a human operated machine and one or more exterior antenna(s) positioned on an external portion of the human operated machine, with a radio frequency shield positioned between the interior antenna(s) and the exterior antenna(s), is usable with a processing module electrically connected with the antennas for analyzing signals received from the antennas to determine whether a radio frequency generating device is active within the at least partially enclosed operator area.

22 Claims, 6 Drawing Sheets

(56) References Cited

U.S. PATENT DOCUMENTS

| | | |
|---|---|---|
| 4,785,280 A | 11/1988 | Fubini |
| 4,843,578 A | 6/1989 | Wade |
| 4,926,417 A | 5/1990 | Futami |
| 4,939,652 A | 7/1990 | Steiner |
| 5,006,829 A | 4/1991 | Miyamoto et al. |
| 5,032,821 A | 7/1991 | Domanico |
| 5,074,144 A | 12/1991 | Krofchalk et al. |
| 5,119,504 A | 6/1992 | Durboraw, III |
| 5,223,844 A | 6/1993 | Mansell et al. |
| 5,225,842 A | 7/1993 | Brown et al. |
| 5,266,922 A | 11/1993 | Smith et al. |
| 5,303,163 A | 4/1994 | Ebaugh et al. |
| 5,305,214 A | 4/1994 | Komatsu |
| 5,309,139 A | 5/1994 | Austin |
| 5,311,197 A | 5/1994 | Sorden et al. |
| 5,325,082 A | 6/1994 | Rodriguez |
| 5,347,260 A | 9/1994 | Ginzel |
| 5,359,528 A | 10/1994 | Haendel |
| 5,365,114 A | 11/1994 | Tsurushima |
| 5,365,451 A | 11/1994 | Wang et al. |
| 5,381,155 A | 1/1995 | Gerber |
| 5,394,136 A | 2/1995 | Lammers |
| 5,400,018 A | 3/1995 | Scholl |
| 5,414,432 A | 5/1995 | Penny, Jr. et al. |
| 5,422,624 A | 6/1995 | Smith |
| 5,424,584 A | 6/1995 | Matsuda |
| 5,430,432 A | 7/1995 | Camhi |
| 5,436,612 A | 7/1995 | Aduddell |
| 5,436,837 A | 7/1995 | Gerstung |
| 5,446,659 A | 8/1995 | Yamawaki |
| 5,453,939 A | 9/1995 | Hoffman |
| 5,457,439 A | 10/1995 | Kuhn |
| 5,475,597 A | 12/1995 | Buck |
| 5,485,161 A | 1/1996 | Vaughn |
| 5,499,182 A | 3/1996 | Ousborne |
| 5,521,579 A | 5/1996 | Bernhard |
| 5,521,580 A | 5/1996 | Kaneko |
| 5,525,960 A | 6/1996 | McCall |
| 5,546,305 A | 8/1996 | Kondo |
| 5,548,273 A | 8/1996 | Nicol |
| 5,581,464 A | 12/1996 | Woll |
| 5,586,130 A | 12/1996 | Doyle |
| 5,600,558 A | 2/1997 | Mearek |
| 5,612,875 A | 3/1997 | Haendel |
| 5,625,337 A | 4/1997 | Medawar |
| 5,642,284 A | 6/1997 | Parupalli |
| 5,648,755 A | 7/1997 | Yagihashi |
| 5,659,289 A | 8/1997 | Zonkoski |
| 5,689,067 A | 11/1997 | Klein |
| 5,708,417 A | 1/1998 | Tallman |
| 5,717,374 A | 2/1998 | Smith |
| 5,719,771 A | 2/1998 | Buck |
| 5,723,768 A | 3/1998 | Ammon |
| 5,740,548 A | 4/1998 | Hudgens |
| 5,742,915 A | 4/1998 | Stafford |
| 5,751,245 A | 5/1998 | Janky et al. |
| 5,764,139 A | 6/1998 | Nojima |
| 5,767,767 A | 6/1998 | Lima |
| 5,777,580 A | 7/1998 | Janky et al. |
| 5,795,997 A | 8/1998 | Gittins |
| 5,797,134 A | 8/1998 | McMillan et al. |
| 5,801,618 A | 9/1998 | Jenkins et al. |
| 5,801,948 A | 9/1998 | Wood |
| 5,815,071 A | 9/1998 | Doyle |
| 5,819,198 A | 10/1998 | Peretz |
| 5,825,283 A | 10/1998 | Camhi |
| 5,825,284 A | 10/1998 | Dunwoody |
| 5,829,782 A | 11/1998 | Breed et al. |
| 5,844,475 A | 12/1998 | Horie |
| 5,847,271 A | 12/1998 | Poublon |
| 5,862,500 A | 1/1999 | Goodwin |
| 5,867,093 A | 2/1999 | Dodd |
| 5,877,678 A | 3/1999 | Donoho |
| 5,880,674 A | 3/1999 | Ufkes |
| 5,880,958 A | 3/1999 | Helms et al. |
| 5,883,594 A | 3/1999 | Lau |
| 5,892,434 A | 4/1999 | Carlson |
| 5,907,277 A | 5/1999 | Tokunaga |
| 5,914,654 A | 6/1999 | Smith |
| 5,918,180 A | 6/1999 | Dimino |
| 5,926,087 A | 7/1999 | Busch |
| 5,928,291 A | 7/1999 | Jenkins et al. |
| 5,941,915 A | 8/1999 | Federle et al. |
| 5,945,919 A | 8/1999 | Trask |
| 5,949,330 A | 9/1999 | Hoffman |
| 5,949,331 A | 9/1999 | Schofield |
| 5,954,781 A | 9/1999 | Slepian |
| 5,955,942 A | 9/1999 | Slifkin |
| 5,957,986 A | 9/1999 | Coverdill |
| 5,964,816 A | 10/1999 | Kincaid |
| 5,969,600 A | 10/1999 | Tanguay |
| 5,974,356 A | 10/1999 | Doyle et al. |
| 5,978,737 A | 11/1999 | Pawlowski |
| 5,982,278 A | 11/1999 | Cuvelier |
| 5,987,976 A | 11/1999 | Sarangapani |
| 5,999,125 A | 12/1999 | Kurby |
| 6,002,327 A | 12/1999 | Boesch |
| 6,008,724 A | 12/1999 | Thompson |
| 6,018,293 A | 1/2000 | Smith |
| 6,026,292 A | 2/2000 | Coppinger et al. |
| 6,028,508 A | 2/2000 | Mason |
| 6,028,510 A | 2/2000 | Tamam |
| 6,037,861 A | 3/2000 | Ying |
| 6,037,862 A | 3/2000 | Ying |
| 6,038,496 A | 3/2000 | Dobler |
| 6,044,315 A | 3/2000 | Honeck |
| 6,059,066 A | 5/2000 | Lary |
| 6,064,886 A | 5/2000 | Perez et al. |
| 6,064,928 A | 5/2000 | Wilson |
| 6,064,970 A | 5/2000 | McMillan et al. |
| 6,067,008 A | 5/2000 | Smith |
| 6,067,009 A | 5/2000 | Hozuka |
| 6,072,388 A | 6/2000 | Kyrtsos |
| 6,073,007 A | 6/2000 | Doyle |
| 6,075,458 A | 6/2000 | Ladner et al. |
| 6,078,853 A | 6/2000 | Ebner |
| 6,081,188 A | 6/2000 | Kutlucinar |
| 6,084,870 A | 7/2000 | Wooten et al. |
| 6,094,149 A | 7/2000 | Wilson |
| 6,098,048 A | 8/2000 | Dashefsky |
| 6,100,792 A | 8/2000 | Ogino |
| 6,104,282 A | 8/2000 | Fragoso |
| 6,108,591 A | 8/2000 | Segal et al. |
| 6,112,145 A | 8/2000 | Zachman |
| 6,121,922 A | 9/2000 | Mohan |
| 6,122,591 A | 9/2000 | Pomerantz |
| 6,130,608 A | 10/2000 | McKeown |
| 6,131,067 A | 10/2000 | Girerd et al. |
| 6,133,827 A | 10/2000 | Alvey |
| 6,141,610 A | 10/2000 | Rothert |
| 6,147,598 A | 11/2000 | Murphy |
| 6,172,602 B1 | 1/2001 | Hasfjord |
| 6,178,374 B1 | 1/2001 | Mohlenkamp et al. |
| 6,184,784 B1 | 2/2001 | Shibuya |
| 6,185,501 B1 | 2/2001 | Smith |
| 6,188,315 B1 | 2/2001 | Herbert et al. |
| 6,195,015 B1 | 2/2001 | Jacobs et al. |
| 6,198,995 B1 | 3/2001 | Settles |
| 6,204,756 B1 | 3/2001 | Senyk |
| 6,204,757 B1 | 3/2001 | Evans |
| 6,208,240 B1 | 3/2001 | Ledesma |
| 6,212,455 B1 | 4/2001 | Weaver |
| 6,216,066 B1 | 4/2001 | Goebel |
| 6,222,458 B1 | 4/2001 | Harris |
| 6,225,898 B1 | 5/2001 | Kamiya |
| 6,227,862 B1 | 5/2001 | Harkness |
| 6,229,438 B1 | 5/2001 | Kutlucinar |
| 6,232,873 B1 | 5/2001 | Dilz |
| 6,246,933 B1 | 6/2001 | Bague |
| 6,246,948 B1 | 6/2001 | Thakker |
| 6,247,360 B1 | 6/2001 | Anderson |
| 6,249,219 B1 | 6/2001 | Perez |
| 6,253,129 B1 | 6/2001 | Jenkins et al. |
| 6,255,892 B1 | 7/2001 | Gartner |

(56) References Cited

U.S. PATENT DOCUMENTS

| | | |
|---|---|---|
| 6,255,939 B1 | 7/2001 | Roth |
| 6,256,558 B1 | 7/2001 | Sugiura et al. |
| 6,262,657 B1 | 7/2001 | Okuda et al. |
| 6,262,658 B1 | 7/2001 | O'Connor |
| 6,265,989 B1 | 7/2001 | Taylor |
| 6,278,361 B1 | 8/2001 | Magiawala |
| 6,285,931 B1 | 9/2001 | Hattori |
| 6,289,332 B2 | 9/2001 | Menig |
| 6,294,988 B1 | 9/2001 | Shomura |
| 6,294,989 B1 | 9/2001 | Schofield |
| 6,295,492 B1 | 9/2001 | Lang |
| 6,297,768 B1 | 10/2001 | Allen, Jr. |
| 6,301,533 B1 | 10/2001 | Markow |
| 6,306,063 B1 | 10/2001 | Horgan et al. |
| 6,308,120 B1 | 10/2001 | Good |
| 6,308,134 B1 | 10/2001 | Croyle et al. |
| 6,313,742 B1 | 11/2001 | Larson |
| 6,320,497 B1 | 11/2001 | Fukumoto |
| 6,331,825 B1 | 12/2001 | Ladner et al. |
| 6,333,686 B1 | 12/2001 | Waltzer |
| 6,337,653 B1 | 1/2002 | Bchler |
| 6,339,739 B1 | 1/2002 | Folke |
| 6,339,745 B1 | 1/2002 | Novik |
| 6,344,805 B1 | 2/2002 | Yasui |
| 6,351,211 B1 | 2/2002 | Bussard |
| 6,353,778 B1 | 3/2002 | Brown |
| 6,356,188 B1 | 3/2002 | Meyers |
| 6,356,822 B1 | 3/2002 | Diaz |
| 6,356,833 B2 | 3/2002 | Jeon |
| 6,356,836 B1 | 3/2002 | Adolph |
| 6,359,554 B1 | 3/2002 | Skibinski |
| 6,362,730 B2 | 3/2002 | Razavi |
| 6,362,734 B1 | 3/2002 | McQuade |
| 6,366,199 B1 | 4/2002 | Osborn |
| 6,378,959 B2 | 4/2002 | Lesesky |
| 6,389,340 B1 | 5/2002 | Rayner |
| 6,393,348 B1 | 5/2002 | Ziegler |
| 6,401,029 B1 | 6/2002 | Kubota et al. |
| 6,404,629 B1 | 6/2002 | Hsu |
| 6,405,112 B1 | 6/2002 | Rayner |
| 6,405,128 B1 | 6/2002 | Bechtolsheim et al. |
| 6,415,226 B1 | 7/2002 | Kozak |
| 6,417,764 B2 | 7/2002 | Tonkin |
| 6,424,268 B1 | 7/2002 | Isonaga |
| 6,427,687 B1 | 8/2002 | Kirk |
| 6,430,488 B1 | 8/2002 | Goldman |
| 6,433,681 B1 | 8/2002 | Foo |
| 6,438,472 B1 | 8/2002 | Tano et al. |
| 6,441,732 B1 | 8/2002 | Laitsaari |
| 6,449,540 B1 | 9/2002 | Rayner |
| 6,452,910 B1 * | 9/2002 | Vij et al. .................. 370/310 |
| 6,459,365 B2 | 10/2002 | Tamura |
| 6,459,367 B1 | 10/2002 | Green |
| 6,459,369 B1 | 10/2002 | Wang et al. |
| 6,459,961 B1 | 10/2002 | Obradovich |
| 6,459,969 B1 | 10/2002 | Bates |
| 6,462,675 B1 | 10/2002 | Humphrey |
| 6,472,979 B2 | 10/2002 | Schofield |
| 6,476,763 B2 | 11/2002 | Allen, Jr. |
| 6,480,106 B1 | 11/2002 | Crombez |
| 6,484,035 B2 | 11/2002 | Allen, Jr. |
| 6,484,091 B2 | 11/2002 | Shibata |
| 6,493,650 B1 | 12/2002 | Rodgers |
| 6,512,969 B1 | 1/2003 | Wang et al. |
| 6,515,596 B2 | 2/2003 | Awada |
| 6,519,512 B1 | 2/2003 | Haas |
| 6,523,912 B1 | 2/2003 | Bond et al. |
| 6,525,672 B2 | 2/2003 | Chainer |
| 6,526,341 B1 | 2/2003 | Bird et al. |
| 6,529,159 B1 | 3/2003 | Fan et al. |
| 6,535,166 B1 | 3/2003 | Zhou |
| 6,542,074 B1 | 4/2003 | Tharman |
| 6,542,794 B2 | 4/2003 | Obradovich |
| 6,552,682 B1 | 4/2003 | Fan et al. |
| 6,556,905 B1 | 4/2003 | Mittelsteadt |
| 6,559,769 B2 | 5/2003 | Anthony |
| 6,564,126 B1 | 5/2003 | Lin |
| 6,567,000 B2 | 5/2003 | Slifkin |
| 6,571,168 B1 | 5/2003 | Murphy |
| 6,577,946 B2 | 6/2003 | Myr |
| 6,587,759 B2 | 7/2003 | Obradovich |
| 6,594,579 B1 | 7/2003 | Lowrey |
| 6,599,243 B2 | 7/2003 | Woltermann |
| 6,600,985 B2 | 7/2003 | Weaver |
| 6,604,033 B1 | 8/2003 | Banet |
| 6,609,063 B1 | 8/2003 | Bender et al. |
| 6,609,064 B1 | 8/2003 | Dean |
| 6,611,740 B2 | 8/2003 | Lowrey |
| 6,611,755 B1 | 8/2003 | Coffee |
| 6,622,085 B1 | 9/2003 | Amita et al. |
| 6,629,029 B1 | 9/2003 | Giles |
| 6,630,884 B1 | 10/2003 | Shanmugham |
| 6,631,322 B1 | 10/2003 | Arthur et al. |
| 6,636,790 B1 | 10/2003 | Lightner |
| 6,638,512 B1 | 10/2003 | Lee |
| 6,643,578 B2 | 11/2003 | Levine |
| 6,651,001 B2 | 11/2003 | Apsell |
| 6,654,682 B2 | 11/2003 | Kane et al. |
| 6,657,540 B2 | 12/2003 | Knapp |
| 6,662,013 B2 | 12/2003 | Takiguchi et al. |
| 6,662,141 B2 | 12/2003 | Kaub |
| 6,664,922 B1 | 12/2003 | Fan |
| 6,665,613 B2 | 12/2003 | Duvall |
| 6,674,362 B2 | 1/2004 | Yoshioka |
| 6,675,085 B2 | 1/2004 | Straub |
| 6,677,854 B2 | 1/2004 | Dix |
| 6,678,612 B1 | 1/2004 | Khawam |
| 6,696,932 B2 | 2/2004 | Skibinski |
| 6,701,234 B1 | 3/2004 | Vogelsang |
| 6,703,925 B2 | 3/2004 | Steffel |
| 6,714,894 B1 | 3/2004 | Tobey et al. |
| 6,718,235 B1 | 4/2004 | Borugian |
| 6,718,239 B2 | 4/2004 | Rayner |
| 6,720,889 B2 | 4/2004 | Yamaki et al. |
| 6,727,809 B1 | 4/2004 | Smith |
| 6,728,542 B2 | 4/2004 | Meda |
| 6,728,605 B2 | 4/2004 | Lash |
| 6,732,031 B1 | 5/2004 | Lighter |
| 6,732,032 B1 | 5/2004 | Banet |
| 6,737,962 B2 | 5/2004 | Mayor |
| 6,741,169 B2 | 5/2004 | Magiawala |
| 6,741,170 B2 | 5/2004 | Alrabady |
| 6,745,153 B2 | 6/2004 | White |
| 6,748,322 B1 | 6/2004 | Fernandez |
| 6,750,761 B1 | 6/2004 | Newman |
| 6,750,762 B1 | 6/2004 | Porter |
| 6,756,916 B2 | 6/2004 | Yanai |
| 6,759,952 B2 | 7/2004 | Dunbridge |
| 6,766,244 B2 | 7/2004 | Obata et al. |
| 6,768,448 B2 | 7/2004 | Farmer |
| 6,775,602 B2 | 8/2004 | Gordon |
| 6,778,068 B2 | 8/2004 | Wolfe |
| 6,778,885 B2 | 8/2004 | Agashe et al. |
| 6,784,793 B2 | 8/2004 | Gagnon |
| 6,784,832 B2 | 8/2004 | Knockeart et al. |
| 6,788,196 B2 | 9/2004 | Ueda |
| 6,788,207 B2 | 9/2004 | Wilkerson |
| 6,792,339 B2 | 9/2004 | Basson |
| 6,795,017 B1 | 9/2004 | Puranik et al. |
| 6,798,354 B2 | 9/2004 | Schuessler |
| 6,803,854 B1 | 10/2004 | Adams et al. |
| 6,807,481 B1 | 10/2004 | Gastelum |
| 6,810,321 B1 | 10/2004 | Cook |
| 6,813,549 B2 | 11/2004 | Good |
| 6,819,236 B2 | 11/2004 | Kawai |
| 6,822,557 B1 | 11/2004 | Weber |
| 6,832,141 B2 | 12/2004 | Skeen et al. |
| 6,845,314 B2 | 1/2005 | Fosseen |
| 6,845,316 B2 | 1/2005 | Yates |
| 6,845,317 B2 | 1/2005 | Craine |
| 6,847,871 B2 | 1/2005 | Malik et al. |
| 6,847,872 B2 | 1/2005 | Bodin |
| 6,847,873 B1 | 1/2005 | Li |
| 6,847,887 B1 | 1/2005 | Casino |

(56) References Cited

U.S. PATENT DOCUMENTS

| | | |
|---|---|---|
| 6,850,841 B1 | 2/2005 | Casino |
| 6,853,910 B1 | 2/2005 | Oesterling |
| 6,859,039 B2 | 2/2005 | Horie |
| 6,859,695 B2 | 2/2005 | Klausner |
| 6,865,457 B1 | 3/2005 | Mittelsteadt |
| 6,867,733 B2 | 3/2005 | Sandhu et al. |
| 6,868,386 B1 | 3/2005 | Henderson et al. |
| 6,870,469 B2 | 3/2005 | Ueda |
| 6,873,253 B2 | 3/2005 | Veziris |
| 6,873,261 B2 | 3/2005 | Anthony |
| 6,879,894 B1 | 4/2005 | Lightner |
| 6,885,293 B2 | 4/2005 | Okumura |
| 6,892,131 B2 | 5/2005 | Coffee |
| 6,894,606 B2 | 5/2005 | Forbes et al. |
| 6,895,332 B2 | 5/2005 | King |
| 6,909,398 B2 | 6/2005 | Knockeart et al. |
| 6,909,947 B2 | 6/2005 | Douros et al. |
| 6,914,523 B2 | 7/2005 | Munch |
| 6,922,133 B2 | 7/2005 | Wolfe |
| 6,922,571 B1 | 7/2005 | Kinoshita |
| 6,922,616 B2 | 7/2005 | Obradovich |
| 6,922,622 B2 | 7/2005 | Dulin |
| 6,925,425 B2 | 8/2005 | Remboski |
| 6,928,348 B1 | 8/2005 | Lightner |
| 6,937,162 B2 | 8/2005 | Tokitsu |
| 6,950,013 B2 | 9/2005 | Scaman |
| 6,954,140 B2 | 10/2005 | Holler |
| 6,958,976 B2 | 10/2005 | Kikkawa |
| 6,960,168 B2 | 11/2005 | Yanagidaira et al. |
| 6,965,827 B1 | 11/2005 | Wolfson |
| 6,968,311 B2 | 11/2005 | Knockeart et al. |
| 6,970,075 B2 | 11/2005 | Cherouny |
| 6,970,783 B2 | 11/2005 | Knockeart et al. |
| 6,972,669 B2 | 12/2005 | Saito |
| 6,980,131 B1 | 12/2005 | Taylor |
| 6,981,565 B2 | 1/2006 | Gleacher |
| 6,982,636 B1 | 1/2006 | Bennie |
| 6,983,200 B2 | 1/2006 | Bodin |
| 6,988,033 B1 | 1/2006 | Lowrey |
| 6,988,034 B1 | 1/2006 | Marlatt et al. |
| 6,989,739 B2 | 1/2006 | Li |
| 7,002,454 B1 | 2/2006 | Gustafson |
| 7,002,579 B2 | 2/2006 | Olson |
| 7,005,975 B2 | 2/2006 | Lehner |
| 7,006,820 B1 | 2/2006 | Parker et al. |
| 7,012,632 B2 | 3/2006 | Freeman et al. |
| 7,019,641 B1 | 3/2006 | Lakshmanan |
| 7,020,548 B2 | 3/2006 | Saito et al. |
| 7,023,321 B2 | 4/2006 | Brillon et al. |
| 7,023,332 B2 | 4/2006 | Saito |
| 7,024,318 B2 | 4/2006 | Fischer |
| 7,027,808 B2 | 4/2006 | Wesby |
| 7,034,705 B2 | 4/2006 | Yoshioka |
| 7,038,578 B2 | 5/2006 | Will |
| 7,042,347 B2 | 5/2006 | Cherouny |
| 7,047,114 B1 | 5/2006 | Rogers |
| 7,049,941 B2 | 5/2006 | Rivera-Cintron |
| 7,054,742 B2 | 5/2006 | Khavakh et al. |
| 7,059,689 B2 | 6/2006 | Lesesky |
| 7,065,349 B2 | 6/2006 | Nath et al. |
| 7,069,126 B2 | 6/2006 | Bernard |
| 7,069,134 B2 | 6/2006 | Williams |
| 7,072,753 B2 | 7/2006 | Eberle |
| 7,081,811 B2 | 7/2006 | Johnston |
| 7,084,755 B1 | 8/2006 | Nord |
| 7,088,225 B2 | 8/2006 | Yoshioka |
| 7,089,166 B2 | 8/2006 | Smith |
| 7,091,880 B2 | 8/2006 | Sorensen |
| 7,098,812 B2 | 8/2006 | Hirota |
| 7,099,750 B2 | 8/2006 | Miyazawa |
| 7,099,774 B2 | 8/2006 | King |
| 7,102,496 B1 | 9/2006 | Ernst |
| 7,109,850 B2 | 9/2006 | Kawazoe et al. |
| 7,109,853 B1 | 9/2006 | Mattson |
| 7,113,081 B1 | 9/2006 | Reichow |
| 7,113,107 B2 | 9/2006 | Taylor |
| 7,117,075 B1 | 10/2006 | Larschan et al. |
| 7,119,696 B2 | 10/2006 | Borugian |
| 7,124,027 B1 | 10/2006 | Ernst |
| 7,124,088 B2 | 10/2006 | Bauer et al. |
| 7,129,825 B2 | 10/2006 | Weber |
| 7,132,934 B2 | 11/2006 | Allison |
| 7,132,937 B2 | 11/2006 | Lu |
| 7,132,938 B2 | 11/2006 | Suzuki |
| 7,133,755 B2 | 11/2006 | Salman |
| 7,135,983 B2 | 11/2006 | Filippov |
| 7,138,916 B2 | 11/2006 | Schwartz |
| 7,139,661 B2 | 11/2006 | Holze |
| 7,145,442 B1 | 12/2006 | Wai |
| 7,149,206 B2 | 12/2006 | Pruzan |
| 7,155,259 B2 | 12/2006 | Bauchot et al. |
| 7,155,321 B2 | 12/2006 | Bromley et al. |
| 7,161,473 B2 | 1/2007 | Hoshal |
| 7,164,986 B2 | 1/2007 | Humphries |
| 7,170,390 B2 | 1/2007 | Quinones |
| 7,170,400 B2 | 1/2007 | Cowelchuk |
| 7,174,243 B1 | 2/2007 | Lightner |
| 7,180,407 B1 | 2/2007 | Guo |
| 7,180,409 B2 | 2/2007 | Brey |
| 7,187,271 B2 | 3/2007 | Nagata |
| 7,188,025 B2 | 3/2007 | Hudson, Jr. |
| 7,196,629 B2 | 3/2007 | Ruoss |
| 7,197,500 B1 | 3/2007 | Israni et al. |
| 7,216,022 B2 | 5/2007 | Kynast et al. |
| 7,216,035 B2 | 5/2007 | Hortner |
| 7,218,211 B2 | 5/2007 | Ho |
| 7,222,009 B2 | 5/2007 | Hijikata |
| 7,225,065 B1 | 5/2007 | Hunt |
| 7,228,211 B1 | 6/2007 | Lowrey |
| 7,233,235 B2 | 6/2007 | Pavlish |
| 7,236,862 B2 | 6/2007 | Kanno |
| 7,239,948 B2 | 7/2007 | Nimmo |
| 7,256,686 B2 | 8/2007 | Koutsky |
| 7,256,700 B1 | 8/2007 | Ruocco |
| 7,256,702 B2 | 8/2007 | Isaacs |
| 7,260,497 B2 | 8/2007 | Watabe |
| RE39,845 E | 9/2007 | Hasfjord |
| 7,269,507 B2 | 9/2007 | Cayford |
| 7,269,530 B1 | 9/2007 | Lin |
| 7,271,716 B2 | 9/2007 | Nou |
| 7,273,172 B2 | 9/2007 | Olsen |
| 7,280,046 B2 | 10/2007 | Berg |
| 7,283,904 B2 | 10/2007 | Benjamin |
| 7,286,917 B2 | 10/2007 | Hawkins |
| 7,286,929 B2 | 10/2007 | Staton |
| 7,289,024 B2 | 10/2007 | Sumcad |
| 7,289,035 B2 | 10/2007 | Nathan |
| 7,292,152 B2 | 11/2007 | Torkkola |
| 7,292,159 B2 | 11/2007 | Culpepper |
| 7,298,248 B2 | 11/2007 | Finley |
| 7,298,249 B2 | 11/2007 | Avery |
| 7,301,445 B2 | 11/2007 | Moughler |
| 7,308,247 B2 | 12/2007 | Thompson et al. |
| 7,317,383 B2 | 1/2008 | Ihara |
| 7,317,392 B2 | 1/2008 | DuRocher |
| 7,317,927 B2 | 1/2008 | Staton |
| 7,319,848 B2 | 1/2008 | Obradovich |
| 7,321,294 B2 | 1/2008 | Mizumaki |
| 7,321,825 B2 | 1/2008 | Ranalli |
| 7,323,972 B2 | 1/2008 | Nobusawa |
| 7,323,974 B2 | 1/2008 | Schmid |
| 7,323,982 B2 | 1/2008 | Staton |
| 7,327,239 B2 | 2/2008 | Gallant |
| 7,327,258 B2 | 2/2008 | Fast |
| 7,333,883 B2 | 2/2008 | Geborek |
| 7,339,460 B2 | 3/2008 | Lane |
| 7,349,782 B2 | 3/2008 | Churchill |
| 7,352,081 B2 | 4/2008 | Taurasi |
| 7,355,508 B2 | 4/2008 | Mian |
| 7,365,639 B2 | 4/2008 | Yuhara |
| 7,366,551 B1 | 4/2008 | Hartley |
| 7,375,624 B2 | 5/2008 | Hines |
| 7,376,499 B2 | 5/2008 | Salman |
| 7,378,946 B2 | 5/2008 | Lahr |

(56) References Cited

U.S. PATENT DOCUMENTS

| | | | |
|---|---|---|---|
| 7,378,949 B2 | 5/2008 | Chen | |
| 7,386,394 B2 | 6/2008 | Shulman | |
| 7,397,363 B2 | 7/2008 | Joao | |
| 7,421,334 B2 | 9/2008 | Dahlgren et al. | |
| 7,433,889 B1 | 10/2008 | Barton | |
| 7,447,509 B2 | 11/2008 | Cossins et al. | |
| 7,474,264 B2 | 1/2009 | Bolduc et al. | |
| 7,474,269 B2 | 1/2009 | Mayer et al. | |
| 7,499,949 B2 | 3/2009 | Barton | |
| 7,565,230 B2 | 7/2009 | Gardner et al. | |
| 7,671,752 B2 | 3/2010 | Sofer | |
| 7,697,917 B2 | 4/2010 | Camp et al. | |
| 7,706,940 B2 | 4/2010 | Itatsu | |
| 7,715,853 B1* | 5/2010 | Frerking et al. | 455/11.1 |
| 7,747,410 B2 | 6/2010 | Van Esch | |
| 7,876,205 B2 | 1/2011 | Catten | |
| 7,880,642 B2 | 2/2011 | Gueziec | |
| 7,898,388 B2 | 3/2011 | Ehrman et al. | |
| 7,941,258 B1 | 5/2011 | Mittelsteadt et al. | |
| 8,044,809 B2 | 10/2011 | Farmer | |
| 8,090,598 B2 | 1/2012 | Bauer et al. | |
| 8,150,628 B2 | 4/2012 | Hyde et al. | |
| 8,311,277 B2 | 11/2012 | Peleg et al. | |
| 8,314,708 B2 | 11/2012 | Gunderson et al. | |
| 8,428,307 B2 | 4/2013 | Bradai et al. | |
| 8,630,768 B2 | 1/2014 | McClellan et al. | |
| 2001/0018628 A1 | 8/2001 | Jenkins et al. | |
| 2002/0005895 A1 | 1/2002 | Freeman et al. | |
| 2002/0019703 A1 | 2/2002 | Levine | |
| 2002/0024444 A1 | 2/2002 | Hiyama et al. | |
| 2002/0103622 A1 | 8/2002 | Burge | |
| 2002/0111725 A1 | 8/2002 | Burge | |
| 2002/0116228 A1 | 8/2002 | Bauer et al. | |
| 2002/0128000 A1 | 9/2002 | do Nascimento | |
| 2002/0173881 A1 | 11/2002 | Lash et al. | |
| 2003/0013460 A1 | 1/2003 | Papadias et al. | |
| 2003/0016636 A1 | 1/2003 | Tari et al. | |
| 2003/0045273 A1 | 3/2003 | Pyhalammi et al. | |
| 2003/0048228 A1* | 3/2003 | Chen | 343/713 |
| 2003/0052797 A1 | 3/2003 | Rock et al. | |
| 2003/0055555 A1 | 3/2003 | Knockeart et al. | |
| 2003/0060950 A1 | 3/2003 | McKeown et al. | |
| 2003/0069000 A1 | 4/2003 | Kindo et al. | |
| 2003/0134660 A1 | 7/2003 | Himmel et al. | |
| 2003/0169185 A1 | 9/2003 | Taylor | |
| 2004/0039504 A1 | 2/2004 | Coffee et al. | |
| 2004/0054687 A1 | 3/2004 | McDonough | |
| 2004/0066330 A1 | 4/2004 | Knockeart et al. | |
| 2004/0077339 A1 | 4/2004 | Martens | |
| 2004/0083041 A1 | 4/2004 | Skeen et al. | |
| 2004/0138794 A1 | 7/2004 | Saito et al. | |
| 2004/0142672 A1 | 7/2004 | Stankewitz | |
| 2004/0143602 A1 | 7/2004 | Ruiz et al. | |
| 2004/0153362 A1 | 8/2004 | Bauer et al. | |
| 2004/0176083 A1 | 9/2004 | Shiao et al. | |
| 2004/0210353 A1 | 10/2004 | Rice | |
| 2004/0225557 A1 | 11/2004 | Phelan et al. | |
| 2004/0236474 A1 | 11/2004 | Chowdhary et al. | |
| 2004/0236475 A1 | 11/2004 | Chowdhary | |
| 2004/0252027 A1 | 12/2004 | Torkkola et al. | |
| 2004/0257245 A1 | 12/2004 | Jo | |
| 2005/0021270 A1 | 1/2005 | Hong et al. | |
| 2005/0064835 A1 | 3/2005 | Gusler | |
| 2005/0070245 A1 | 3/2005 | Nath et al. | |
| 2005/0091018 A1 | 4/2005 | Craft | |
| 2005/0096809 A1 | 5/2005 | Skeen et al. | |
| 2005/0119002 A1 | 6/2005 | Bauchot et al. | |
| 2005/0119030 A1 | 6/2005 | Bauchot et al. | |
| 2005/0131597 A1 | 6/2005 | Raz et al. | |
| 2005/0137757 A1 | 6/2005 | Phelan et al. | |
| 2005/0171663 A1 | 8/2005 | Mittelsteadt et al. | |
| 2005/0184860 A1 | 8/2005 | Taruki et al. | |
| 2005/0255874 A1 | 11/2005 | Stewart-Baxter et al. | |
| 2006/0055565 A1 | 3/2006 | Kawamata et al. | |
| 2006/0080359 A1 | 4/2006 | Powell et al. | |
| 2006/0121951 A1 | 6/2006 | Perdomo et al. | |
| 2006/0154687 A1 | 7/2006 | McDowell | |
| 2006/0190822 A1 | 8/2006 | Basson | |
| 2006/0193749 A1 | 8/2006 | Ghazarian et al. | |
| 2006/0212195 A1 | 9/2006 | Veith et al. | |
| 2006/0212495 A1 | 9/2006 | Veith et al. | |
| 2006/0220905 A1 | 10/2006 | Hovestadt | |
| 2006/0234711 A1 | 10/2006 | McArdle | |
| 2006/0265125 A1 | 11/2006 | Glaza | |
| 2006/0281495 A1 | 12/2006 | Yang | |
| 2006/0284769 A1 | 12/2006 | Bolduc et al. | |
| 2007/0005240 A1 | 1/2007 | Oumi et al. | |
| 2007/0005404 A1 | 1/2007 | Raz et al. | |
| 2007/0027726 A1 | 2/2007 | Warren et al. | |
| 2007/0040928 A1 | 2/2007 | Jung et al. | |
| 2007/0050130 A1 | 3/2007 | Grimm et al. | |
| 2007/0057781 A1 | 3/2007 | Breed | |
| 2007/0124332 A1 | 5/2007 | Ballesty et al. | |
| 2007/0126601 A1 | 6/2007 | Park | |
| 2007/0136078 A1 | 6/2007 | Plante | |
| 2007/0186923 A1 | 8/2007 | Poutiatine et al. | |
| 2007/0202929 A1 | 8/2007 | Satake | |
| 2007/0229234 A1 | 10/2007 | Smith | |
| 2007/0236342 A1 | 10/2007 | Hines et al. | |
| 2007/0260363 A1 | 11/2007 | Miller | |
| 2007/0293206 A1 | 12/2007 | Lund | |
| 2008/0030316 A1 | 2/2008 | Flick | |
| 2008/0064413 A1 | 3/2008 | Breed | |
| 2008/0064446 A1 | 3/2008 | Camp et al. | |
| 2008/0086508 A1 | 4/2008 | Ballew | |
| 2008/0120175 A1 | 5/2008 | Doering | |
| 2008/0122603 A1 | 5/2008 | Plante | |
| 2008/0221787 A1 | 9/2008 | Vavrus | |
| 2008/0252487 A1 | 10/2008 | McClellan et al. | |
| 2008/0255722 A1 | 10/2008 | McClellan et al. | |
| 2008/0255888 A1 | 10/2008 | Berkobin | |
| 2008/0262670 A1 | 10/2008 | McClellan et al. | |
| 2008/0296968 A1 | 12/2008 | Culbert | |
| 2008/0319602 A1 | 12/2008 | McClellan et al. | |
| 2008/0319604 A1 | 12/2008 | Follmer et al. | |
| 2009/0085728 A1 | 4/2009 | Catten | |
| 2010/0032632 A1 | 2/2010 | Catten | |
| 2010/0033577 A1 | 2/2010 | Doak et al. | |
| 2010/0036610 A1 | 2/2010 | Urciuoli et al. | |
| 2010/0130182 A1 | 5/2010 | Rosen | |
| 2010/0134182 A1 | 6/2010 | Kapoor et al. | |
| 2010/0265074 A1 | 10/2010 | Namba et al. | |
| 2011/0115618 A1 | 5/2011 | Catten | |
| 2011/0179080 A1 | 7/2011 | Miyazaki et al. | |
| 2012/0181765 A1 | 7/2012 | Hill et al. | |
| 2012/0229254 A1* | 9/2012 | Nowottnick | 340/5.61 |
| 2013/0076577 A1* | 3/2013 | Chakam et al. | 343/713 |

FOREIGN PATENT DOCUMENTS

| | | |
|---|---|---|
| CA | 2631103 | 11/2008 |
| DE | 19700353 | 7/1998 |
| EP | 0843177 | 5/1998 |
| EP | 1811481 | 7/2007 |
| GB | 2434346 | 7/2007 |
| GB | 2454224 | 5/2009 |
| JP | 2005-250825 | 9/2005 |
| JP | 2007235530 | 9/2007 |
| WO | WO 2004019646 | 3/2004 |
| WO | WO 2005003885 | 1/2005 |
| WO | WO 2005109273 | 11/2005 |
| WO | WO 2005109369 | 11/2005 |
| WO | WO 2008045320 | 8/2008 |
| WO | WO 2008109477 | 9/2008 |
| WO | WO 2013033756 | 3/2013 |

OTHER PUBLICATIONS

Shen et al., "A Computer Assistant for Vehicle Dispatching with Learning Capabilities", Annals of Operations Research 61, 1995, pp. 189-211. (The month of Publication is Irrelevant since the year of Publication is clearly prior to the filing of the Application).
Tijerina et al., "Final Report Supplement; Heavy Vehicle Workload

(56) References Cited

OTHER PUBLICATIONS

Assessment; Task 5; Workload Assessment Protocol", U.S. Department of Transportation, Oct. 1996, 69 pages.

Myra Blanco, "Effects of In-Vehicle Information System (IVIS) Tasks on the Information Processing Demands of a Commercial Vehicle Operations (CVO) Driver", Dec. 1999, 230 pages.

Zhu et al., "A Small Low-Cost Hybrid Orientation system and Its Error Analysis", Sensors Journal, IEEE—vol. 9, Issue 3, Digital Object Identifier: 10.1109/JSEN.2008.2012196; Publication Year: Mar. 2009, pp. 223-230.

Almazan et al., "Full auto-calibration of a smartphone on board a vehicle using IMU and GPS embedded sensors", Intelligent Vehicles Symposium (IV), 2013 IEEE; Digital Object Identifier: 10.1109/IVS.2013.6629658; Publication Year: Jun. 2013, pp. 1374-1380.

Lupton et al., "Efficient Integration of Inertial Observations Into Visual Slam Without Initialization", Intelligent Robots and Systems, 2009, IROS 2009, IEEE/RSJ International Conference on: Digital Object Identifier: 10.1109/IROS.2009.5354267, Publication Year: Oct. 2009, pp. 1547-1552.

Mungula et al., "Attitude and Heading System Based on EKF Total State Configuration", Industrial Electronics (ISIE), 2011 IEEE International Symposium on; Digital Object Identifier: 10.1109/ISIE.2011.5984493; Publication Year: Jun. 2011, pp. 2147-2152.

Huddle et al., "Application of Inertial Navigation Systems to Geodetic Position and Gravity Vector Survey", Decision and Control including the 17th Symposium on Adaptive Processes, 1978 IEEE Conference on; vol. 17, Part 1; Digital Object Identifier: 10.1109/CDC.1978.267967; Publication Year: 1978, pp. 459-465.(The month of Publication is irrelevant since the year of Publication is clearly prior to the filing of the Application).

Zhao Yan et al., "Attitude Measurement of Driver's Head Based on Accelerometer and Magnetoresistive Sensor", Fluid Power and Mechatronics (FPM), 2011 International Conference on; Digital Object Identifier: 10.1109/FPM.2011.6045836; Publication Year: Aug. 2011, pp. 613-617.

Google Maps, "Google Maps", Available at least as early as Dec. 29, 2014. Whole Document.

U.S. Appl. No. 11/767,325, mail date Jun. 8, 2009, Office Action.
U.S. Appl. No. 11/755,556, Sep. 1, 2009, Office Action.
U.S. Appl. No. 11/866,247, Sep. 29, 2009, Office Action.
U.S. Appl. No. 11/755,556, May 4, 2010, Office Action.
U.S. Appl. No. 11/866,247, Jun 25, 2010, Notice of Allowance.
U.S. Appl. No. 11/767,325, Aug. 3, 2010, Office Action.
U.S. Appl. No. 11/866,247, Nov. 29, 2010, Notice of Allowance.
U.S. Appl. No. 11/768,056, Jan. 18, 2011, Office Action.
U.S. Appl. No. 12/222,260, Jan. 19, 2011, Office Action.
U.S. Appl. No. 13/012,660, Feb. 16, 2011, Office Action.
U.S. Appl. No. 11/768,056, Sep. 16, 2011, Office Action.
U.S. Appl. No. 12/222,260, Oct. 14, 2011, Office Action.
U.S. Appl. No. 13/012,660, Nov. 14, 2011, Office Action.
U.S. Appl. No. 11/768,056, Feb. 16, 2012, Office Action.
U.S. Appl. No. 12/222,260, Mar. 29, 2012, Office Action.
U.S. Appl. No. 13/012,660, Apr. 11, 2012, Office Action.
U.S. Appl. No. 11/768,056, Jul. 19, 2012, Office Action.
U.S. Appl. No. 13/012,660, Aug. 1, 2012, Office Action.
U.S. Appl. No. 11/767,325, Oct. 12, 2012, Office Action.
U.S. Appl. No. 12/222,260, Nov. 7, 2012, Office Action.
U.S. Appl. No. 13/012,660, Nov. 26, 2012, Office Action.
U.S. Appl. No. 13/012,660, Mar. 18, 2013, Office Action.
U.S. Appl. No. 11/767,325, Apr. 24, 2013, Office Action.
U.S. Appl. No. 12/222,260, Jun. 5, 2013, Office Action.
U.S. Appl. No. 11/768,056, Jun. 21, 2013, Office Action.
U.S. Appl. No. 13/012,660, Jul. 8, 2013, Office Action.
U.S. Appl. No. 11/805,237, Oct. 28, 2013, Notice of Allowance.
U.S. Appl. No. 12/379,083, Jan. 3, 2014, Office Action.
U.S. Appl. No. 11/779,178, Feb. 6, 2014, Office Action.
U.S. Appl. No. 11/768,056, Feb. 6, 2014, Office Action.
U.S. Appl. No. 13/012,660, Feb. 13, 2014, Office Action.
U.S. Appl. No. 11/758,444, Feb. 21, 2014, Office Action.
U.S. Appl. No. 12/379,153, Mar. 17, 2014, Office Action.
U.S. Appl. No. 11/779,178, May 27, 2014, Notice of Allowance.
U.S. Appl. No. 13/012,660, Jun. 6, 2014, Notice of Allowance.
U.S. Appl. No. 11/755,556, Jun. 10, 2014, Office Action.
U.S. Appl. No. 12/379,155, Jun. 19, 2014, Office Action.
U.S. Appl. No. 11/758,444, Jun. 27, 2014, Office Action.
U.S. Appl. No. 12/975,489, Oct. 1, 2014, Notice of Allowance.
U.S. Appl. No. 12/379,153, Oct. 6, 2014, Office Action.
U.S. Appl. No. 12/379,153, Jan. 9, 2015, Notice of Allowance.
U.S. Appl. No. 12/379,083, Mar. 17, 2015, Office Action.
U.S. Appl. No. 11/755,556, Mar. 30, 2015, Notice of Allowance.

* cited by examiner

WIRELESS DEVICE DETECTION USING MULTIPLE ANTENNAS SEPARATED BY AN RF SHIELD

CROSS-REFERENCE TO RELATED APPLICATIONS

This application claims the benefit of and priority to U.S. Provisional Patent Application Ser. No. 61/897,648 filed on Oct. 30, 2013 and entitled "WIRELESS DEVICE DETECTION USING MULTIPLE ANTENNAS SEPARATED BY AN RF SHIELD," which application is expressly incorporated herein by reference in its entirety.

BACKGROUND OF THE INVENTION

1. Technical Field

This disclosure relates to an apparatus, system, and method for detecting the transmission of wireless devices in human operated machinery.

2. Background and Relevant Art

As mobile devices have increased in popularity and features, accidents involving distracted drivers have also increased. Substantial efforts have been made to educate the public regarding the dangers of distracted driving and to prevent drivers from using mobile devices while driving. Some jurisdictions have gone so far as to enact laws prohibiting the use of wireless devices while driving. Similarly, many companies have implemented policies that strictly prohibit the use of mobile devices while operating company machinery, such as cars, mining equipment, or other similar machines.

One difficulty in implementing such policies is the inability of organizations to determine whether the operators are actually using mobile devices while operating vehicles or other machinery. While some systems have been developed to detect the use of mobile devices, these systems have been unable to distinguish whether the mobile device is being used within the operator area of the vehicle or other machinery. In particular, it can be difficult to distinguish between mobile phone use within a vehicle or machine and mobile phone use near the vehicle or machine.

As one will understand, implementing effective policies that restrict the use of wireless devices within human operated machinery is made more difficult by the inability to identify violations of the policy. Accordingly, there is a need for systems, apparatus, or methods that can accurately determine whether a mobile device is being used and in some instances, whether the device is simply 'on' or 'active' within a vehicle or some other type of human operated machinery.

BRIEF SUMMARY OF THE INVENTION

Embodiments of the present invention comprise systems, methods, and apparatus configured to detect whether an RF transmission comes from a cellular or other RF transmitting device and whether that transmission comes from within or outside of a defined space. In some embodiments, the transmission or other operation of a wireless device is detectable within an operator area of human operated machinery. In particular, embodiments of the present invention provide apparatus, systems, and methods for determining whether a detected radio signal originates from within the operator's area of the human operated machinery or from a location outside of the operators area. For example, systems described herein provide embodiments for determining whether a radio signal is being generated and transmitted from within the cab of a vehicle or from a source outside of the vehicle.

An example embodiment can include an apparatus and/or system used for determining whether an operator of machinery is using a mobile device. The apparatus and/or system can comprise one or more interior or first antenna(s) positioned within an at least partially enclosed operator area of a human operated machine. One or more external or second antenna(s) can be positioned on an external portion of the human operated machine. Additionally, a radio frequency shield can be positioned between the first/interior antenna(s) and the second/exterior antenna(s).

When the shield provides only partial reduction of the signal transmission magnitude emitted from within a vehicle or machinery operator area, the signals detected by both the interior and exterior antennas are correlated to confirm that the signals correspond to a same transmission from a single mobile device. Then, the signal strength detected at the antennas for the various signals that are determined to correspond to the same transmission are analyzed to determine whether the transmission emitted from within or outside of the operator area, as described herein. For example, it can be determined that the transmission originated from within the operator area when the signal strength detected by the interior antenna(s) for the transmission is stronger than the signal strength detected by the exterior antenna(s) for the same transmission.

When the shield provides sufficient reduction of the RF signal transmissions such that the RF signal transmission cannot be detected above the ambient RF noise emitted from within the operator area, the composite signals detected at the different antennas can also be comparatively used to determine whether a particular signal is emitted from within the operator area, as described herein.

A processing module in electrical communication with the first and second antennas compares the signals received from the first and second antennas. The processing module can then determine, based upon the comparisons of the first and second signals, whether a radio frequency generating device is active within the at least partially enclosed operator area.

Additionally, embodiments of the invention can also include one or more corresponding methods for detecting the transmission or active 'on' status of a radio frequency generating device within an operator area of a human operated machine.

In embodiments where the shielding provides only partial attenuation, the methods of the invention can include detecting the signals detected by both the interior and exterior antennas and correlating signals that correspond to a same transmission from a single mobile device. Then, the methods can include comparing the signal strength of correlated signals to determine whether the transmission emitted from within or outside of the operator area, wherein it is determined that the transmission originated from within the operator area when the signal strength detected by the interior antenna(s) for the transmission is stronger than the signal strength detected by the exterior antenna(s) for the same transmission.

The methods of the invention can also include, for full attenuation shielding, receiving, at a processing module, a first composite signal from a first antenna positioned within an at least partially enclosed operator area of a human operated machine. These methods can also include receiving, at the processing module, a second composite signal from a second antenna positioned exterior to the at least partially enclosed operator area of the human operated machine. Additionally, a radio frequency attenuator can be positioned between the first antenna and the second antenna. The methods can further include comparing the first composite signal received from the first antenna and the second composite signal received from the second antenna, and then determining, based upon the comparison of the first composite signal and the second composite signal, whether a radio frequency generating device is active within the at least partially enclosed operator area.

Additional features and advantages of exemplary embodiments of the invention will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
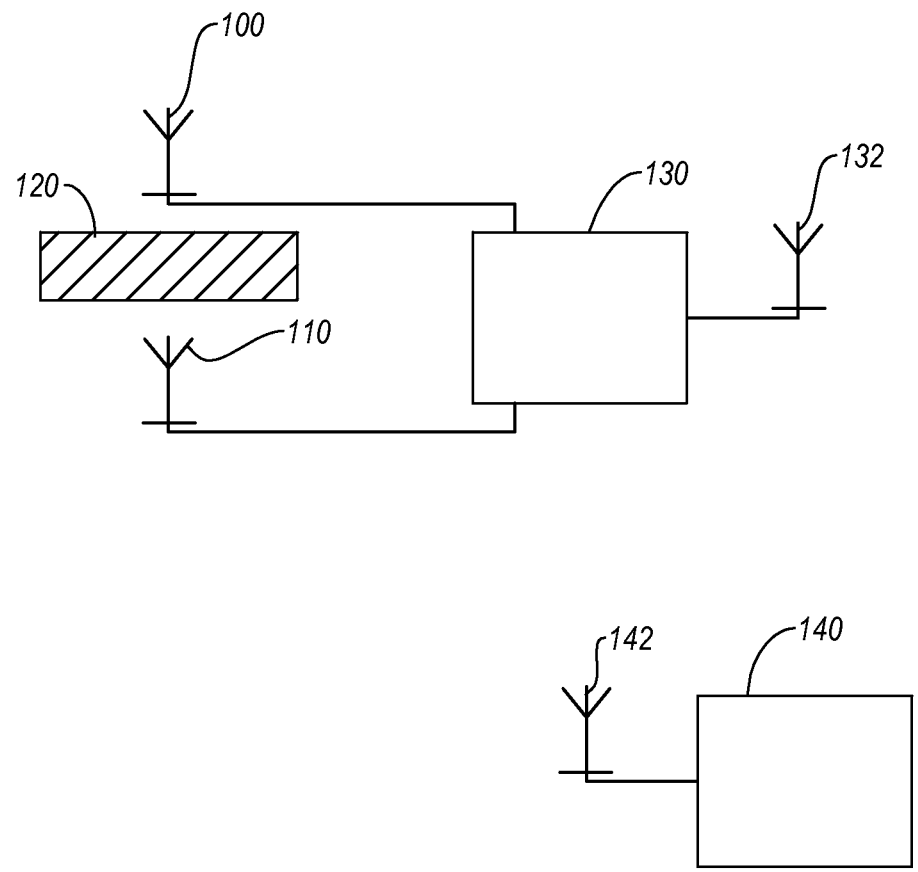
FIG. 1 illustrates a simplified schematic of a system for wireless device detection using multiple antennas separated by a radio frequency shield.

The present invention extends to systems, methods, and apparatus configured to detect whether an RF transmission comes from a cellular or other RF transmitting device and whether that transmission comes from within or outside of a defined space. In some embodiments, the transmission or other operation of a wireless device is detectable within an operator area of human operated machinery. In particular, embodiments of the present invention provide apparatus, systems, and methods for determining whether a detected radio signal originates from within the operator's area of the human operated machinery or from a location outside of the operators area. For example, systems described herein provide embodiments for determining whether a radio signal is being generated and transmitted from within the cab of a vehicle or from a source outside of the vehicle.

Some existing systems have attempted to detect the location of a mobile device relative to a vehicle based on a detected power of the signal emitted from the mobile device, as detected by one or more receiving antennas. However, this is problematic for several reasons. For example, mobile devices can be serviced by several different providers, and each mobile device will typically only communicate with the communication towers associated with the respective service providers. The further the mobile devices are positioned from the towers, the more signaling power is typically required and utilized by the mobile devices. As such, multiple mobile devices may be present within a relatively confined area, and each device may be transmitting at significantly different power levels based upon the distance between each mobile device and its respective service provider's tower.

Furthermore, the radio signals emitted from mobile devices will reflect off of various surfaces of the vehicle/machinery so that the receiving antenna(s) will detect multiple instances of the same signals at various attenuated or intensified power levels. This multi-path effect is similar to an echo reverberating in a canyon, such that in such a small confined space it is practically impossible to detect the exact location of the originating source. The foregoing problem is even further exacerbated when multiple mobile devices are utilized at the same time within a relatively close proximity.

Accordingly, for at least the foregoing reasons, it can be difficult to detect the location of an emitted mobile device RF signal based solely on the detected power of that emitted RF signal.

By way of example, a trucking company may desire to enforce no-phone policies within their truck fleet. However, it will be appreciated that the monitored truck may be surrounded by other vehicles or pedestrians that are using their own mobile phones while that monitored truck drives within a city or on a highway. Radio frequencies from each of these mobile phones may enter into and travel through the operator area of the truck at various power levels. As such, simply detecting the presence of radio frequencies within the cab of the truck may be insufficient to determine whether a mobile phone is being used within the truck. Additionally, numerous false positives may be detected, potentially resulting in a truck driver being inappropriately reprimanded.

As such, at least one embodiment described herein, provides a system for distinguishing between RF transmissions that originate from within the operator area of a machine and those that originate from outside of the operator area. In at least one embodiment, a first antenna is placed within the operator area of the machine, and a second antenna is placed external to the operator area. As defined herein, the term "operator area" refers to any area of a vehicle or machinery, including human operated devices, wherein a human operator can be positioned. The operator area is preferably constrained by a frame and is at least partially enclosed. The operator area can also include controls for controlling the vehicle or machinery. However, in this regard, it will be appreciated that the operator area can also include passenger area where a passenger can be positioned during operation of the vehicle or machinery. In some instance, the operator area is very large, such as in a multi-person transport vehicle. In other instances, the operator area is more constrained, such as the cabin of a crane or tractor.

It will be appreciated that the term vehicle and machinery are interchangeable and can refer to any device or other machine that is capable of moving or performing a mechanical process while a person is positioned within the operator area of the machine. For example, a vehicle or machine can refer to a car, a crane, a bulldozer, a mining shovel, a boat, an airplane, or any number of other similar devices or machines.

A radio frequency (RF) attenuator or shield is positioned between the first antenna and the second antenna. As referenced within this application, the 'RF shield' and 'RF attenuator' are interchangeably used to describe any material, component or medium, either active or inactive, that measurably reduces the signal strength of a radio signal. For example, in at least one embodiment, an RF shield can comprise an electrically conductive material or medium such as a metallic sheet, metallic fabric, metallic screen, metallic paint, or any other electrically conductive material or medium, including highly conductive non-metallic materials. Intentionally or unintentionally positioning an RF shield between the first antenna and the second antenna will, at least to some extent, electromagnetically isolate the antennas from each other such that a signal originating within an operator area will be measurably stronger at the first antenna within an operator area (on an inner side of the RF shield) than at the second antenna positioned outside of the operator area (on an outer side of the RF shield). In some embodiments, the RF shield can provide substantially complete attenuation of signals emitted from the operator area or only partial attenuation of the signals emitted from the operator area.

Some embodiments of the invention also correlate detected transmission from a mobile device with operation of the vehicle/machinery where the mobile device is being utilized. Accordingly, embodiments of the invention can determine whether a machine/vehicle is being operated while a mobile device is 'powered on, transmitting RF signals, and is located inside or within the operator area of the machine or vehicle'.

FIG. 1 illustrates a simplified schematic of a system for wireless device detection using multiple antennas separated by a radio frequency shield. As depicted, a first antenna 100 and a second antenna 110 are in communication with a processing unit 130. The processing unit 130 may communicate with a remote computing system 140 through mutual antennas 132, 142. Additionally, an RF shield 120 separates the first antenna 100 and the second antenna 110.

The processing unit 130 and the remote computing system 140 each include one or more respective hardware processors and system memory or other storage devices having stored computer-executable instructions which, when executed by the one or more processors, implement the processes described herein, for differentiating whether a signal transmission originates from within or external to an operator area. The processing unit 130 and/or remote computing system 140 can each perform all or any limited portion of the processing required for performing the differentiation described herein. Each of the processing unit 130 and the remote computing system 140 can be a stand-alone computer device or a distributed computing system that incorporates a plurality of other computing devices. While the foregoing embodiment refers to wireless communication between the antennas and the processing unit 130, it will be appreciated that the data received from each antenna can be sent to the remote computing system 140 via one or more wired or wireless communication channels for the comparative analysis to be performed by the remote computing system 140.

In at least one embodiment, the processing unit 130 performs signal analysis to determine whether a detected radio signal is generated from within an operator area of a machine or if the detected radio signal is generated from outside the operator area. The processing unit 130 may also be configured to issue mentoring messages within the operator area, such as to turn the wireless device off, to turn the machine off (or otherwise influence the operation of the machine), and/or to prepare a report on the detected radio signal. The prepared report can either be saved locally for later download or transmitted to the remote computing system 140 for access by a third party. The processing unit 130 can also transmit the report to the remote computing system 140 in real-time or at some other time interval. In alternate embodiments, the processing unit 130 performs basic signal analysis on the detected signal and transmits data to the remote computing system 140 for the further processing described herein.

Figure 2A:
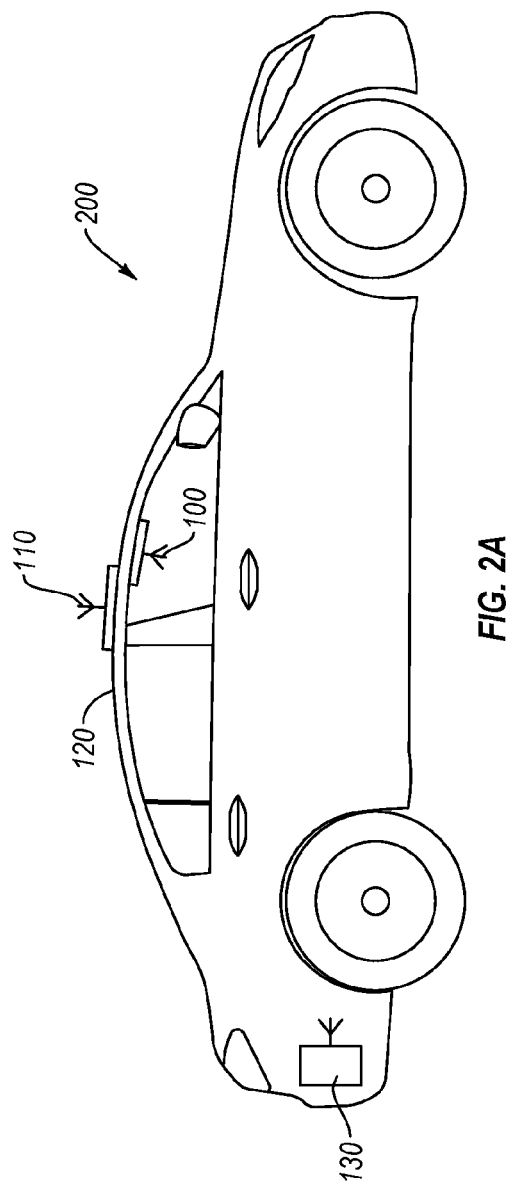
FIG. 2A illustrates an embodiment of the system of FIG. 1 within a car.

FIG. 2A illustrates an embodiment of the system of FIG. 1 within a car 200. In particular, a first antenna 100 is attached to the ceiling within the car cab, and a second antenna 110 is attached to the roof of the car 200 on the outside of the operator area. Additionally, a processing unit 130 is positioned within the trunk or any other area of the car 200. The processing unit is in communication with the first antenna 100 and the second antenna 110 through a wired connection and/or through one or more wireless communication media. The processing unit 130 may also be in further communication with a remote computing system (not shown), such as remote computing system 140, referenced above.

In at least one embodiment, the roof of the car 200 functions as the RF shield 120. In some instances, the vehicle's roof is not constructed of a material or medium that sufficiently attenuates the RF transmissions originating from within that vehicle. In those instances, a material or medium can be introduced between antenna 100 and antenna 110 such that the additional material or medium can function as an RF shield. In some embodiments, the base or mounting plate of the first and/or second antenna is configured with a sufficient size and material property to effectively operate as the RF shield.

It will be appreciated that the first antenna 100 and the second antenna 110 can be positioned in locations other than those depicted in FIG. 2A. For example, the second antenna 110 can be attached to the bottom of the car, the side of the car, the hood of the car, or some other part of the car that is separated from the first antenna by one or more RF shield(s). Furthermore, the first antenna can comprise any quantity of one or more interior antennas positioned within the operator area and the second antenna can comprise any quantity of two or more exterior antennas positioned outside of the operator area. In any case, at least one RF shield at least partially isolates the first antenna(s) 100 from the second antenna(s) 110 in a direction relative to a signal emitted from the operator area.

It will also be appreciated that the first antenna(s) 100 and the second antenna(s) 110 can be of the same antenna type or of different antenna types. By way of example, and not limitation, in the case that both antennas are of the same type, the first antenna and the second antenna may both be omnidirectional. In contrast, in the case that the first antenna 100 and the second antenna 110 are of a different type, the first antenna 100 can comprise a directional antenna, while the second antenna can comprise an omnidirectional antenna. Though only a couple of antenna types are mentioned herein, one will understand that the first antenna 100 and the second antenna 110 can comprise a variety of different antenna types and still function as described.

In addition to not being limited to a particular antenna type, one will understand that the depiction of a car in FIG. 2A is not meant to limit the claimed system to a vehicle. For example, embodiments of the depicted system can be implemented in heavy equipment, like tractors, mining machinery, cranes, other construction equipment, busses, trucks, trains, trollies, trams, ferries, boats, ships, airplanes, or within any other human operated machine that has an at least partially enclosed operator area. As such the present invention provides a flexible platform that can be implemented in a variety of different settings to provide wireless detection.

Figure 2B:
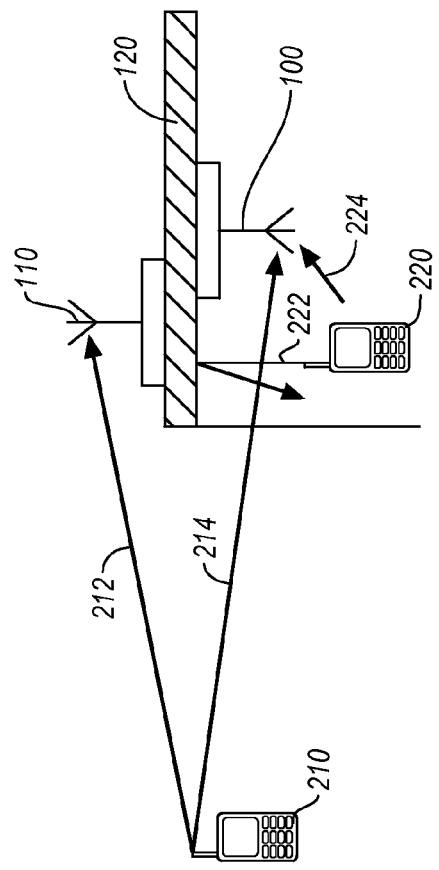
FIG. 2B illustrates a close-up view of a feature of the system depicted in FIG. 2A.

FIG. 2B depicts a close-up view of the first antenna, second antenna, and RF shield of FIG. 2A. Additionally, FIG. 2B includes an external mobile phone 210 that is outside of the operator area of the car 200 and an internal mobile phone 220 that is inside the operator area of the car 200. Also depicted are four rays 212, 214, 222, and 224, each representing a component of a corresponding radio signal that is at least partially directed towards a respective antenna 100, 110. One will understand that radio signals do not behave as rays when being broadcast. In FIG. 2B, however, for the sake of clarity and simplicity, rays are used to indicate a radio signal travelling in a particular direction, and in some cases, being prevented from traveling in specific directions.

In the depicted example, the external mobile phone 210 may be associated with a pedestrian talking on a phone as the car 200 from FIG. 2A passes. As depicted, both the first antenna 100 and the second antenna 110 detect the radio signals from the external mobile phone 210. In particular, as depicted by ray 212 and ray 214, the first antenna 100 and the second antenna 110 may both receive signals of similar strength and composition from the external mobile phone 210. The signal 214 received by the first antenna 100 may be slightly attenuated by a windshield, window, or some other body component of the car 200. But, in at least one embodiment, the signals received by the first antenna 100 and the second antenna 110 from the external mobile phone 210 are identifiably similar in strength/power.

Also depicted in FIG. 2B, the internal mobile phone 220 is broadcasting ray 222 directed towards the second antenna 110 and ray 224 directed towards the first antenna 100. Notably, ray 222 and ray 224 correspond to a same signal transmission. In this case, however, the RF shield 120 blocks, either completely or partially, the radio signal (222) being broadcast towards the second antenna 110. As such, the first antenna 100 receives a strong reading of the radio signal (224) being broadcast by the internal mobile phone 220 and a reading of the radio signal (214) being broadcast by the external mobile phone 210. In contrast, the second antenna 110 receives a reading of the radio signal (212) being broadcast by the external mobile device 210, but little or no reading of the radio signal (222) being broadcast by the internal mobile device 220. Rays 212 and 214 correspond to a same signal transmission, whereas rays 212 and 214 do not correspond to the same signal transmission or device as rays 222 and 224. While FIG. 2B depicts only a single internal mobile phone 220 and a single external mobile phone 210, the described system can function with multiple mobile phones either inside or outside the operator area corresponding to many different signal transmissions.

Figure 3:
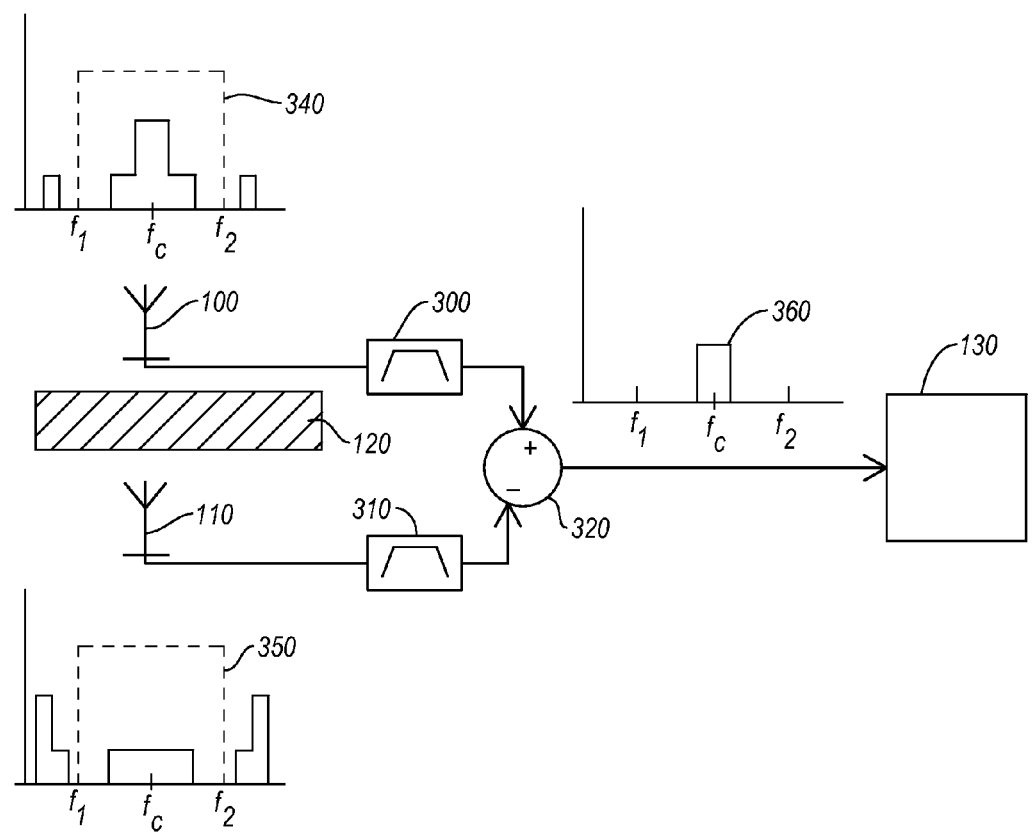
FIG. 3 illustrates a schematic of the system of FIG. 2A, including example signals.

FIG. 3 illustrates one example of a schematic of the system described above in FIG. 2A and FIG. 2B. In addition to system components, the FIG. 3 depicts example signals 340, 350, 360 at different stages of the system. For example, the first antenna 100 receives composite signal 340 and the second antenna 110 receives composite signal 350. Composite signal 340 comprises a signal received from the internal mobile phone 220 and the exterior mobile phone 210. Composite signal 350, on the other hand, comprises a signal from the external mobile phone 210 and includes little or no signal from the internal mobile phone 220.

Both composite signals received by the first antenna 100 and the second antenna 310 can be passed through filters 300, 310. In particular, the filters 300, 310 can include band pass filters that are configured to filter out radio frequencies that do not relate to devices of interest. For example, the filters 300, 310 can be configured to pass through frequencies related to Wi-Fi, cellular phone use, Bluetooth use, and other frequencies of interest, but ignore and/or filter out frequencies related to AM and FM radio transmission, television transmission, and other similar frequencies that are not related to devices of interest. As depicted in FIG. 3, a dotted box surrounds the portion of each composite signal 340, 350 that the band pass filter is centered around.

In at least one embodiment after filtering, corresponding to full attenuation shielding, the composite signal from the second antenna 110 can be subtracted from the composite signal from the first antenna 100. Subtracting the composite 350 signal from the second antenna 110 from the composite signal 340 received by the first antenna 100 will cause the similar signal components detected by the second antenna 110 to be removed from the same signal components detected by the first antenna 100. Accordingly, with reference to FIG. 2B, if the second antenna only detected the signal from the external mobile phone 210, while the first antenna detected a signal from both the external mobile phone 210 and the internal mobile phone 200, subtracting the composite signal received by the second antenna 110 from the composite signal received by the first antenna 100 will result in a signal that corresponds to the signal broadcast by the internal mobile phone 220. FIG. 3 depicts the resulting signal as signal 360.

In at least one embodiment, removing signals detected by the second antenna 110 from the signals detected by the first antenna 100 can functionally remove ambient noise from the signal detected by the first antenna 100. In other words, subtracting the signal 350 from signal 340 can result in a signal that comprises components that were predominantly generated on the same side of the RF shield 120 as the first antenna 100.

The resulting signal 360 can be transmitted to a processing unit 130 and/or forwarded to a remote computing system 140 (not shown) that can individually or cooperatively determine that a mobile phone was in use within the operator area of the car 200. The processing unit 130 and/or remote computing system 140 can also determine whether the car 200 or other machine was being operated at the time of the detected mobile phone use.

In at least one embodiment, the processing unit 130 can determine if a mobile phone is in use within the operator area of the car by identifying if the power contained within signal 360 rises above a threshold. One will understand that even after subtracting signal 350 from signal 340, additional radio signals may be present within the operator area of the car 200—even though no wireless device is present within the operator area, such as signals generated by the car itself or other signals reflected within the car that originated from outside of the car. Accordingly, in at least one embodiment, a threshold is used to determine if signal 360 indicates that a device is active within the operator area. The threshold can be a pre-defined threshold or an adjustable threshold that accounts for any of the original signal strength, the type of signal detected, the frequency of the signal, and/or historical detected signal characteristics.

In some embodiments, the shielding between the interior and exterior antennas is only sufficient to partially attenuate a signal emitted from the operator area of a vehicle or other machinery. For instance, the emitted signal can be reflected out of the operator area until it is detected by the exterior antenna(s). Additionally, when the shielding fails to fully prevent transmission of the signal through the shielding, the exterior antenna(s) will be able to detect a partially attenuated signal corresponding to the emitted transmission.

Figure 4:
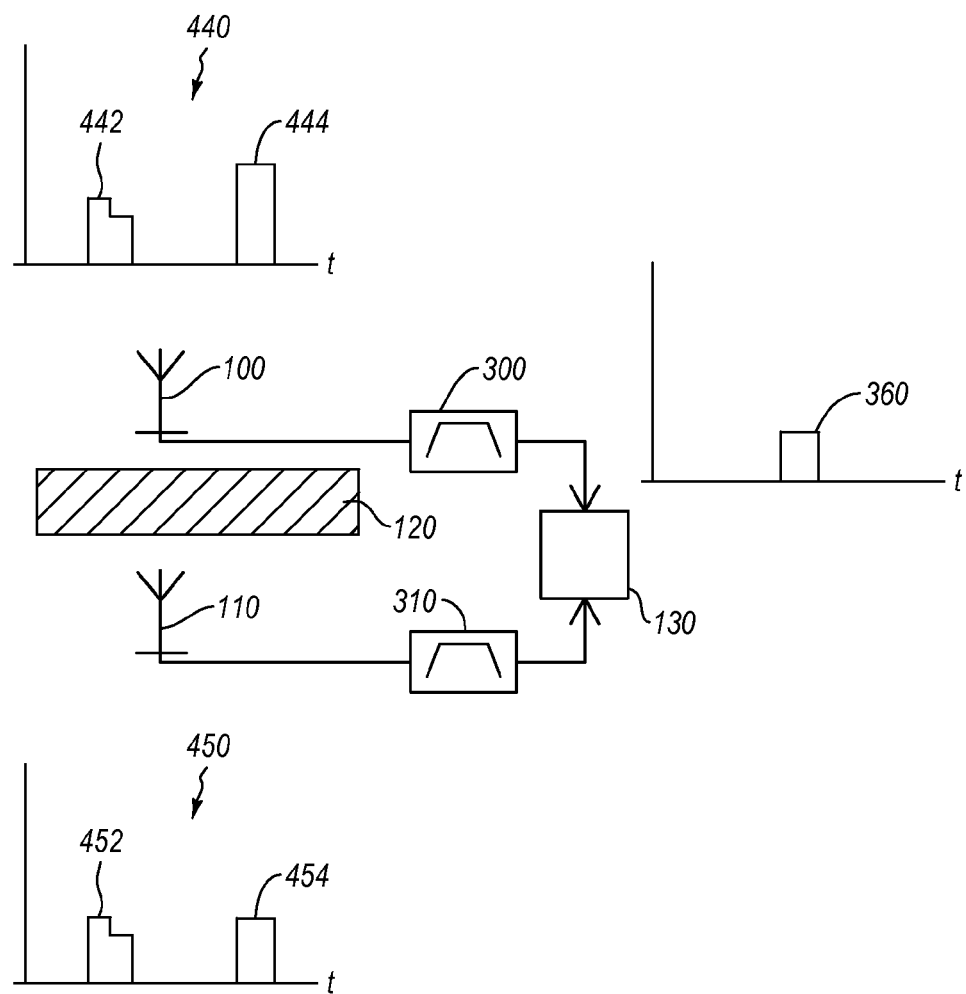
FIG. 4 illustrates another schematic of the system of FIG. 2A, including example signals.

For example, FIG. 4 depicts an embodiment where the signals detected by the interior and exterior antennas 100, 110 are analyzed to identify signal pulses and/or other signal characteristics that are sufficient to correlate signals corresponding to a same transmission and/or device. In some instances, this can include scraping and analyzing transmission meta-data. In other instances, this can include analyzing signal types, transmission frequencies and channels, signal durations, relative signal amplitudes, and/or other similar signal characteristics. In the depicted example, the first antenna 100 detects signal 440 and the second antenna 110 detects signal 450, and the detected signals 440, 450 are then analyzed and correlated within the time domain.

For example, signal component 442 from signal 440 can be correlated with signal component 452 from signal 450. In addition to identifying sufficient correlation between signal component 452 and signal component 442, processing unit 130 can also identify differences in amplitude between the correlated signal components. For example, the processing unit can determine that signal component 452 and signal component 442 appear to have significantly similar waveforms. As such, the processing unit 130 can determine that both signal component 442 and signal component 452 originated from outside of an operators area because neither signal appears to have been significantly attenuated by the RF shield 120.

The processing unit 130 can also correlate signal component 444 and signal component 454. In this case, however, the processing unit 130 can identify a significant difference in amplitude between signal component 444 and signal component 454. Based upon the identified difference in amplitude, the processing unit 130 can determine that signal component 440 originated within the operating area and that the resulting signal component 454 was attenuated by the RF shield 120 before reaching the second antenna 110.

One will understand that the depicted signal components 452, 442, 444, 454 are merely illustrative of a particular embodiment. In practice, the signal components may comprise carrier waves, phase information, frequency information, and other similar signal traits. The signal components 452, 442, 444, 454 in FIG. 4, however, are depicted in a simplified form to more clearly depict the step of signal correlation. In general, multiple different means can be used to correlate signals and signal components to each other. In particular, in at least one embodiment, the method of correlating signals and signal components is configured to clearly identify correlated signals that have been significantly attenuated with respect to each other.

Upon determining that a signal is being generated from within the operator area, the processing unit 130 can transmit a mentoring message to occupants of the operator area that instruct the user to discontinue use of the mobile device, discontinue use of the vehicle/machinery, transmit the data to a remote computing system (not shown), and/or otherwise store the information for later access.

The processing unit 130 can also identify unique characteristics of the identified signal that is being generated within the operator area and store these identified unique characteristics for further processing. These identified unique characteristics can be used, for instance, to later verify that the detected phone belonged to an individual that was present within the operator area and that is associated with a user account that identifies the phone of the user as well as the vehicle. The identified unique characteristics may also be used later to more easily identify when a signal is being generated from within the operator area, which can also be correlated with driving records and phone log records.

In at least one embodiment, the processing unit 130 can comprise a network analyzer, or perform at least some functions of a network analyzer. For example, the processing unit 130 can be used to determine the type of signal being broadcast (i.e., SMS text, phone call, data connection, etc.). Additionally, the processing unit 130 may be able to determine a destination of the signal, as well as the origination device. Also, in at least one embodiment, the processing unit 130 may be able to identify whether the signal is directed towards an emergency service.

Further, in at least one embodiment, the remote computing system (140 from FIG. 1) can comprise a mobile phone account management system, which can provide access to mobile phone plans and accounts. As such, in at least one embodiment, upon detecting a mobile phone being used within the operator area of a car, the processing unit 130 can notify the remote computing system 140, which can then access network records to determine whether a mobile phone associated with the driver of the car is currently active. This may provide the benefit of distinguishing between passengers and operators using mobile phones. For example, a bus driver may be prohibited from using mobile devices, while passengers of the bus may be free to do so. Accordingly, in at least one embodiment, upon detecting the wireless signal originating from within the bus, the remote computing system can access network records and determine if the bus driver's mobile phone is active, and thus distinguish between passengers' mobile devices and the bus driver's mobile devices.

In an alternative embodiment, the remote computing system 140 first identifies that a mobile device that is associated with a particular user account is active. In this case, "active" can include the phone transmitting information, the phone receiving information, an application being executed on the phone, the phone being powered on, the phone being in a low power state, and/or the phone otherwise performing an electronic function. The remote computing system 140 can identify that the mobile device is active by communicating with a cellular carrier that is associated with the user account, by directly accessing an application running on the mobile device, by accessing information received from a cellular tower, or through any number of other methods for identifying a powered on mobile device.

Once the remote computing system 140 determines that a mobile device is active, the remote computing system 140 can access the processing unit 130 within the vehicle or machine to determine if a wireless signal is being generated within the operator area, using the methods and systems described above. In at least one embodiment, this may provide more reliable results because the remote computing system 140 first determines that a mobile device of interest is active, and then determines if a mobile device is being used within the operator area, instead of continually attempting to distinguish between internally originating and externally originating signals.

Accordingly, FIGS. 1-3 and the corresponding text illustrate or otherwise describe various components, apparatus, and systems that can detect a radio signal that is generated within the operator area of a machine. Specifically, embodiments described herein can distinguish between radio signals that originate outside the operator area and signals that originate within the operator area. As such, embodiments described herein can distinguish between a car occupant using a wireless device and a wireless device being used by a passerby who is outside the car.

As described above, the proliferation of wireless devices has significantly increased the likelihood of radio signals being detectable within an operator area of a machine, even though those radio signals were not generated within the operator area. As such, the present systems, apparatus, and methods provide a solution to a growing problem.

In addition to the foregoing, embodiments of the present invention can also be described in terms of methods comprising one or more acts for accomplishing a particular result. Along these lines, FIGS. 5-6B illustrates a method described below with reference to the modules and components of FIGS. 1 through 4.

Figure 5:
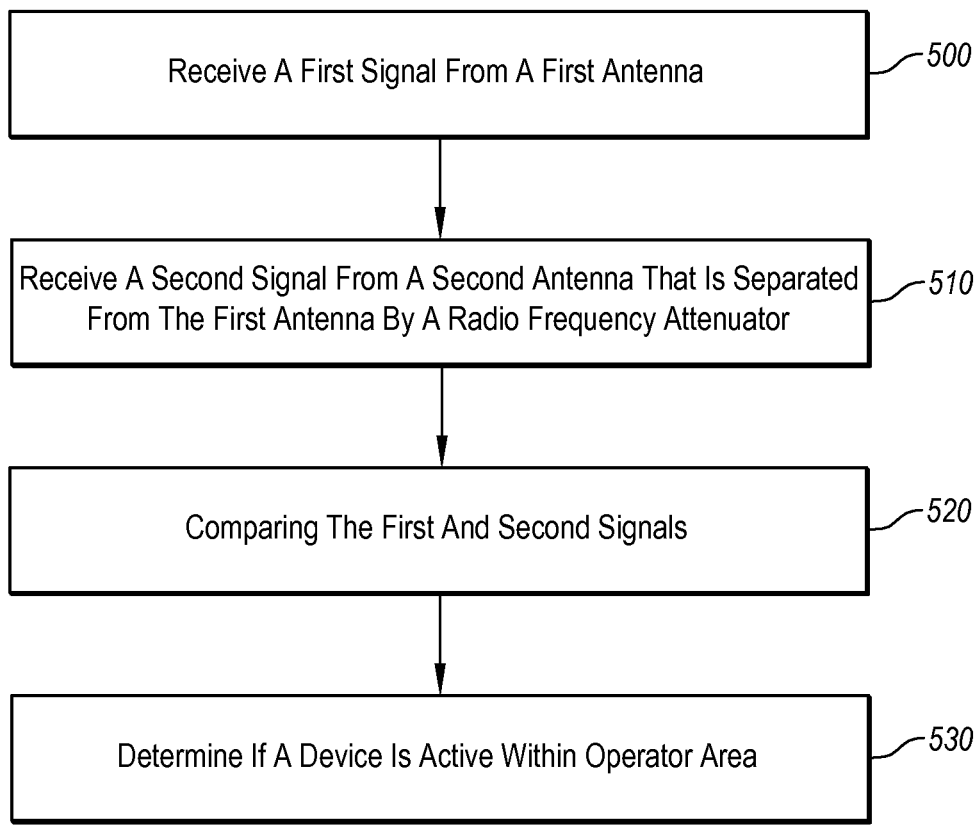
FIG. 5 describes a method for using multiple antennas separated by a radio frequency attenuator to detect use of a wireless device.

For example, FIG. 5 illustrates that a method for detecting the use of a radio frequency generating device within an operator area of a human operated machine can include act 500 of receiving a first signal from a first antenna. Act 500 includes receiving, at a processing module, a first signal from a first antenna positioned within an at least partially enclosed operator area of a human operated machine. For example, FIG. 2B depicts the first antenna 100 receiving a signal from the internal mobile phone 220. As further shown in FIG. 3, the received signal 340 is then communicated to a processing unit 130.

FIG. 5 also shows that the method can include act 510 of receiving a second signal from a second antenna that is separated from the first antenna by a radio frequency attenuator. The second signal can be a same signal as the first signal, only at a reduced signal strength, or a composite signal that is different than the first composite signal, as described above. In at least one implementation, at least components of the first signal and the second signal originate from the same signal source at the same moment in time, even though they may arrive at the respective antennas at different times and with different signal properties resulting from their traversing different paths to the respective antennas. Act 510 includes receiving, at the processing module, the second signal from a second antenna positioned exterior to the at least partially enclosed operator area of the human operated machine, wherein a radio frequency attenuator (e.g., shield) is positioned between the first antenna and the second antenna. In this embodiment, the RF attenuator operates in such a manner as to substantially shield the exterior antenna from signals emitted from within the operator area relative to signals detected by the interior antenna.

Similar to the description above, FIG. 2B depicts the second/exterior antenna 110 receiving a signal from the external mobile phone 210. The second antenna is depicted as being on the outside of the car 200. Additionally, an RF shield 120 separates the first antenna 100 from the second antenna 110. As further shown in FIG. 3, the received signal 350 is then communicated to a processing unit 130.

FIG. 5 shows that the method can also include act 520 of comparing the first signal and the second signal. Act 520 includes comparing features and attributes of the first signal received from the first antenna and the second signal received from the second antenna, even though the signals may be the same signals of different signal strength. In these embodiments, the signal comparison includes correlating signals corresponding to the same transmission or device, in which case the signals are the same signals that are only detected at different signal strengths. As indicated above, this correlation can also include, therefore, identifying pulses, signal frequencies, or other identifying characteristics of the matching transmission signal. Thereafter, the comparison can include determining a signal strength of the corresponding detected signal by the interior and exterior antenna to determine whether the strength of the signal detected by the interior antenna is greater than the signal strength detected for the signal by the exterior antenna, in which case the signal originated from within the operator area.

Comparison of the signals can also include comparing different composite signals. For example, FIG. 3 depicts an embodiment where a signal 350 received from the second antenna 110 is subtracted from a signal 340 received by the first antenna 100 when the signals are different composite signals. The resulting signal 360 is then analyzed by processing unit 130. In this way, the signal are compared to each other by removing the components in the signal 350 received by the second antenna 110 from the signal 340 received by the first antenna 100.

One will understand, however, that other methods of comparing the signals can be used as equivalents to the method described herein. It will also be appreciated that signal strength measurements can be tracked at various times and with various sample rates to determine whether a stronger signal is detected by the first antenna within the operator area as opposed to the signal strength detected by the second antenna located outside of the operator area at the various sample times.

Comparing the first and second signals can also include scraping the metadata, patterns and/or signatures from the first and/or second signals to differentiate and/or distinguish particular signal types or to associate a particular signal with a particular user mobile device or account, as generally suggested above.

In an alternative embodiment, the relative origination of the signals can be determined without directly comparing the signals. For example, the signal strengths of each respective signal can be entered into an equation and then the resulting value can be compared to a baseline value to determine whether the signal originated from within the operator area. In this example, the actual signals are not compared to each other.

With regard to sampling the various signals, it will be appreciated that the processing unit 130 and the remote computing system 140 can also be configured to sample and record the types and strengths of the signals detected the antennas at any desired intervals. In some instances, the sampling is only performed during operation of the vehicle/machine. In other instances, sampling is performed periodically at a fixed interval rate. In yet other instances, the sampling is performed at different variable interval rates responsively to different detected circumstances, such as, but not limited to times of the day, speed of the vehicle, location of the vehicle/machinery, detected number of occupants in the vehicle/machinery, administrator preferences, and so forth.

FIG. 5 shows that the methods of the invention can include an act 530 of determining if a device is active within the operator area. Act 530 can include determining, based upon the comparison of the first signal and the second signal, whether a radio frequency generating device is active within the at least partially enclosed operator area. For example, FIG. 2B depicts an interior mobile phone 220 that is being used. As depicted the active interior mobile phone 220 is generating a signal that is detected by the first antenna 100 but not by the second antenna 110, or at least not at the same strength as the signal is detected by the first antenna 100. Additionally, as shown in FIG. 3, the determination can also be made in some embodiments after subtracting the composite signal 350 received by the second antenna 110 from the composite signal 340 received by the first antenna 100. In at least the foregoing ways, the described system of interior and exterior antennas separated by a RF shield positioned on or near an operator area can distinguish between a radio signal generated within the operator area and a radio signal generated outside of the operator area.

The various acts shown in FIG. 5 can be performed iteratively at various intervals, as described above. Furthermore, the methods of the invention can include performing all of the acts at a single system or by a plurality of systems. Accordingly, one or more advantages can be achieved using systems, apparatus, and methods described herein. It will also be appreciated, with regard to the foregoing that the accuracy of various measurements and/or collection of the various RF data can be sensitive to and/or vary with different environmental conditions such as temperature, humidity, reflective surfacing, etc. Accordingly, the aforementioned measuring of RF power, as performed by the antennas and other system components, is temperature sensitive and will, therefore, compensate for the different environmental conditions by including temperature compensatory circuitry/software and other environmental compensatory circuitry/software at the antennas and/or other processing units (130, 140) to compensate for any variability caused by a detected environmental condition.

Figure 6A:
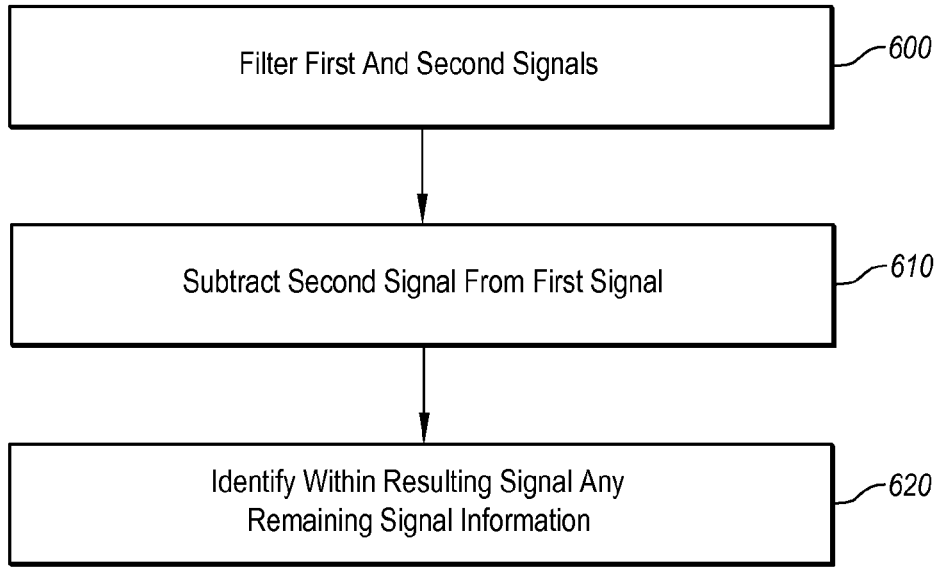
FIG. 6A describes a method for using correlating signals detected by a first and second antenna.
Figure 6B:
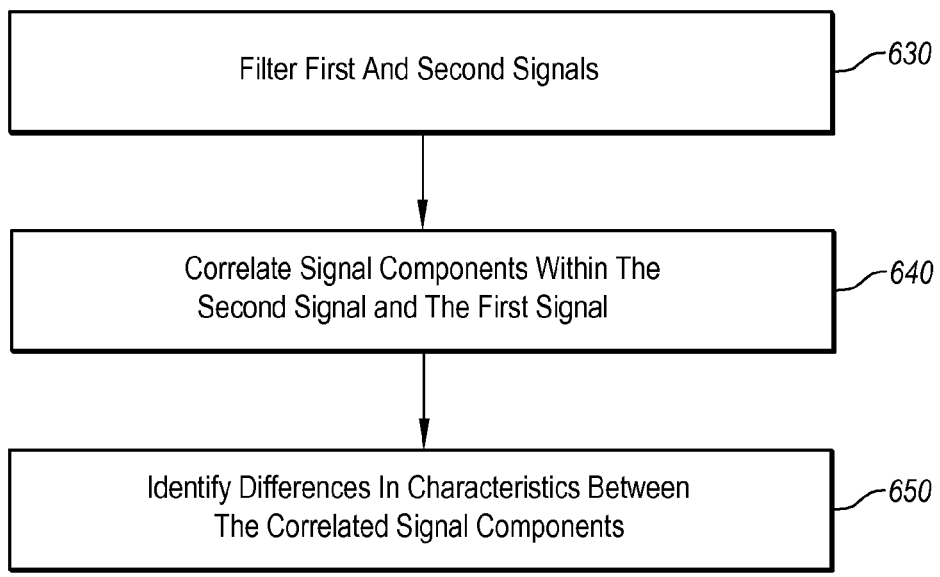
FIG. 6B describes another method for using correlating signals detected by a first and second antenna.

As an example of at least one embodiment for comparing the first and second signals, FIG. 6A illustrates that a method for comparing a first signal and a second signal can include act 600 of filtering first and second signals. Act 600 can include passing the first signal and the second signal through one or more filters. In particular, the filters can comprise band pass filters that are configured to filter out any signals and frequencies that are not of interest. For example, it may be desirable to filter out Bluetooth signals, radio signals, TV signals, and other signals that are not related to mobile phones. In various embodiments, the filters can be static or dynamic, digital or analog, or any combination of thereof.

FIG. 6A also shows that the method can include act 610 of subtracting the second signal from the first signal. Act 610 can include inverting the second signal and adding it to the first signal or directly subtracting the second signal from the first signal. The step of subtracting the second signal from the first signal can be performed by a digital processing unit, one or more discrete analog components, one or more integrated components, or through other similar components.

FIG. 6A also shows that the method can include act 620 of identifying within a resulting signal any remaining signal information. Act 620 can include identifying any residual first signal components that remain after subtracting the second signal from the first signal. In at least one embodiment, Act 620 includes only identifying remaining signal information that exceeds a specific threshold. The threshold can be determined in a number of different ways. For instance, the threshold can be a previously determined static threshold, a dynamic threshold that automatically adjusts to be a certain level higher than the noise floor, a dynamic threshold that is automatically calculated based upon the power of the first signal and/or the second signal, or a dynamic threshold that is otherwise calculated.

As an additional example of at least one embodiment for comparing the first and second signals, FIG. 6B illustrates that a method for comparing a first signal and a second signal can include act 630 of filtering the first and second signals. Similar to Act 600 above, Act 630 can include passing the first signal and the second signal through one or more filters. The filters can comprise band pass filters that are configured to filter out any signals and frequencies that are not of interest. In various embodiments, the filters can be static or dynamic, digital or analog, or any combination of thereof.

FIG. 6B also shows that the method can include act 640 of correlating signal components within the second signal and the first signal. Specifically, act 640 can include identification of various sub-components of the second signal that correlate with similar sub-components within the first signal. In at least one embodiment, the first signal and the second signal both respectively contain any signals that are being detected by the first antenna and the second antenna. As such, the first signal may contain multiple individual signals that are being broadcast from a variety of different devices. The second signal can also similarly comprise a variety of different signals being received from different signals. In at least one embodiment, "sub-components" can include the individual signals that are contained with either the first signal or second signal, respectively.

Accordingly, act 640 can comprise identifying, within the first signal, sub-components, or individual signals, that are associated with single devices and correlating those identified individual signals with sub-components, or individual signals, within the second signal that are associated with the same respective device. Sub-components from the first signal can be matched with sub-components from the second signal by comparing scraped data, such as metadata, by comparing frequency and channel information, by matching patterns of the sub-components within the first signal with patterns of sub-components with the second signal, or by any other known method of signal matching.

FIG. 6B also shows that the method can include act 650 of identifying differences in characteristics between the correlated signal components. Act 650 can include identifying a specific sub-component from the first signal comprises significantly more power than the correlated sub-component from the second signal. Put another way, act 650 can include identifying that the sub-component from the second signal appears to be attenuated by at least a threshold amount. In at least one embodiment, the attenuation level of the RF shield determines the threshold level.

Accordingly, FIGS. 6A and 6B both provide methods for comparing the first signal with the second signal. One will understand that different methods for comparing the first signal to the second signal may exist that if used would fall within the bounds of the present invention.

The present invention may be embodied in other specific forms without departing from its spirit or essential characteristics. For instance, while the foregoing embodiments have been described with specific reference to differentiating whether a mobile device is on and/or is transmitting signals from within an operator area of a vehicle/machinery, based on the use of two antennas and an RF shield interposed between the two antennas, it will be appreciated that the inventive concepts of the present invention can also extend to the use of the antennas and RF shield to differentiate whether a mobile device is active or being utilized within any predetermined location or facility by positioning the RF shield on a wall of the facility and by positioning the antennas on opposing sides of the RF shield.

The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

I claim:
1. An apparatus used for determining whether a mobile device is transmitting from within a human operated machine, the apparatus comprising:
   a first antenna positioned within an at least partially enclosed operator area of a human operated machine;

a second antenna positioned external to the operator area of the human operated machine;
a radio frequency shield positioned between the first antenna and the second antenna; and
a processing module that is in electrical communication with the first antenna and the second antenna, wherein the processing module is configured to:
receive a first signal received from the first antenna and a second signal received from the second antenna, and
determine, based upon an analysis of the first signal and the second signal, whether a radio frequency generating device is active within the at least partially enclosed operator area.

2. The apparatus as recited in claim 1, wherein the human operated machine is an automobile and the operator area is a cab of the vehicle.

3. The apparatus as recited in claim 1, wherein the human operated machine is a piece of industrial equipment.

4. The apparatus as recited in claim 1, wherein the radio frequency shield comprises a component of the human operated machine.

5. The apparatus as recited in claim 1, wherein the first and second signals are the same transmission signal at different signal strengths.

6. The apparatus as recited in claim 1, wherein the processing module comprises a remote server.

7. The apparatus as recited in claim 1, wherein the second antenna is positioned on a roof of the human operated machinery.

8. The apparatus as recited in claim 1, wherein the first signal and the second signal both originate from a signal source at a same moment in time.

9. A system installed in a human operated machine configured to detect transmission of a radio frequency generating device within the human operated machine, the system comprising:
a first antenna positioned within an at least partially enclosed operator area of a human operated machine;
a second antenna positioned external to the at least partially enclosed operator area of the human operated machine;
a radio frequency shield positioned between the first antenna and the second antenna; and
a processing module that receives information generated by the first antenna and the second antenna, wherein the processing module is configured to:
receive a first signal received from the first antenna and a second signal received from the second antenna, and
determine, based upon an analysis of the first signal and the second signal, whether a radio frequency generating device is active within the at least partially enclosed operator area.

10. The system as recited in claim 9, wherein the processing module comprises a remote server.

11. The system as recited in claim 9, wherein the first signal and the second signal are correlated as being a same signal transmitted from a single radio frequency generating device and wherein the first signal has a greater signal strength, as detected by the first antenna, than a signal strength detected by the second signal, as detected by the second antenna, and wherein it is determined based on relative signal strength of the first and second signals that the single radio frequency generating device is transmitting from within the at least partially enclosed operator area.

12. The system as recited in claim 9, wherein if it is determined that a radio frequency generating device is active within the at least partially enclosed operator area, the processing module is further configured to access a mobile phone account management system and determine whether a radio frequency generating device that is associated with a specific account holder is active.

13. The system as recited in claim 9, wherein the processing module is further configured to:
subtract at least a portion of the second signal from at least a portion of the first signal; and
identify at least a portion of the first signal that is a threshold amount greater than a corresponding portion of the second signal.

14. The system as recited in claim 9, wherein the processing module comprises one or more band pass filters configured to filter the first signal and the second signal.

15. The system as recited in claim 9, wherein the processing module comprises a network analyzer.

16. A method for detecting the transmission of a radio frequency generating device that is located within an operator area of a human operated machine, the method comprising:
receiving, at a processing module, a first signal from a first antenna positioned within an at least partially enclosed operator area of a human operated machine;
receiving, at the processing module, a second signal from a second antenna positioned exterior to the at least partially enclosed operator area of the human operated machine, wherein a radio frequency attenuator is positioned between the first antenna and the second antenna relative to a signal originating from within the operator area;
receiving the first signal received from the first antenna and the second signal received from the second antenna; and
determining, based upon an analysis of the first signal and the second signal, whether a radio frequency generating device is active within the at least partially enclosed operator area.

17. A method as recited in claim 16, wherein analyzing the first signal and the second signal comprises:
filtering the first signal and the second signal with one or more band pass filters; and
comparing one or more signal pulses within the filtered first signal to one or more signal pulses within the filtered second signal.

18. A method as recited in claim 16, wherein analyzing the first signal and the second signal comprises subtracting at least a portion of the second signal from at least a portion of the first signal.

19. A method as recited in claim 18, wherein determining whether a radio frequency generating device is active within the at least partially enclosed operator area comprises identifying at least a portion of the first signal that is a threshold amount greater than a corresponding portion of the second signal.

20. A method as recited in claim 16, wherein the method further includes correlating the first signal and the second signal as corresponding to a single signal transmission or a single radio frequency generating device and wherein the first signal has a greater signal strength, as detected by the first antenna, than a signal strength of the second signal as detected by the second antenna, and wherein it is determined based on relative signal strength of the first and second signals that the single radio frequency generating device is transmitting from within the at least partially enclosed operator area.

21. A method as recited in claim 16, further comprising:
extracting frequency information from the first signal and the second signal; and identifying, based upon the extracted frequency information, data relating to one or more communications that are being received by the first antenna and the second antenna.

22. A computer storage device having stored computer-executable instructions which, when executed by at least one hardware processor, implement a method for detecting the use of a radio frequency generating device by within an operator area of a human operated machine, wherein the method includes:
- receiving, at a processing module, a first signal from a first antenna positioned within an at least partially enclosed operator area of a human operated machine;
- receiving, at the processing module, a second signal from a second antenna positioned exterior to the at least partially enclosed operator area of the human operated machine, wherein a radio frequency attenuator is positioned between the first antenna and the second antenna relative to a signal originating from within the operator area;
- comparing the first signal received from the first antenna and the second signal received from the second antenna to correlate the first and second signals as being a same signal at different strengths; and
- determining, based upon the comparison of the first signal and the second signal and relative strengths of the first and second signal, whether a radio frequency generating device corresponding to the first and second signals is active within the at least partially enclosed operator area.

* * * * *

UNITED STATES PATENT AND TRADEMARK OFFICE
CERTIFICATE OF CORRECTION

Page 1 of 1

PATENT NO.       : 9,172,477 B2
APPLICATION NO.  : 14/181007
DATED            : October 27, 2015
INVENTOR(S)      : Lawrence It is certified that error appears in the above-identified patent and that said Letters Patent is hereby corrected as shown below:

IN THE SPECIFICATION

<u>Column 7</u>
Line 67, change "antenna 310" to --antenna 110--

Signed and Sealed this
First Day of March, 2016

Michelle K. Lee
*Director of the United States Patent and Trademark Office*